United States Patent
Ho et al.

(10) Patent No.: US 12,543,255 B2
(45) Date of Patent: Feb. 3, 2026

(54) LIGHTING CONTROL SYSTEM WITH LIGHT SHOW OVERRIDES

(71) Applicant: Lutron Technology Company LLC, Coopersburg, PA (US)

(72) Inventors: Horace C. Ho, Austin, TX (US); Julianne M. Trenary, Austin, TX (US); Matthew R. Blakeley, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 39 days.

(21) Appl. No.: 18/524,512

(22) Filed: Nov. 30, 2023

(65) Prior Publication Data

US 2025/0185144 A1    Jun. 5, 2025

Related U.S. Application Data

(63) Continuation of application No. 17/375,682, filed on Jul. 14, 2021, now Pat. No. 11,871,495.
(Continued)

(51) Int. Cl.
  *H05B 47/10* (2020.01)
  *H05B 47/16* (2020.01)
(52) U.S. Cl.
  CPC .................................. *H05B 47/16* (2020.01)
(58) Field of Classification Search
  CPC ...... H05B 47/10; H05B 47/105; H05B 47/14; H05B 47/16; H05B 45/10; G06F 3/04847; H04W 4/80
  See application file for complete search history.

(56) References Cited

U.S. PATENT DOCUMENTS

| 5,357,170 A | 10/1994 | Luchaco et al. |
| 6,236,303 B1 | 5/2001 | Wagner et al. |

(Continued)

FOREIGN PATENT DOCUMENTS

| CN | 103298202 A | 9/2013 |
| CN | 103687188 A | 3/2014 |

(Continued)

OTHER PUBLICATIONS

Final Office Action, U.S. Appl. No. 16/356,896, dated Mar. 26, 2021, 11 pages.
(Continued)

*Primary Examiner* — Jimmy T Vu
(74) *Attorney, Agent, or Firm* — Michael S. Czarnecki; Glen R. Farbanish; Philip N. Smith

(57) ABSTRACT

Systems and methods are disclosed for a load control system which produces a show by adjusting one or more parameter values, such as color temperature, intensity, spectrum, volume, load state, and position of a window covering, as a function of a show time equal to a current time of day. The load control system is responsive to receiving commands to adjust the show time with respect to the current time of day. The load control system is configured to respond to the received commands by initiating a temporary system override in which the one or more parameter values may rewind or forward in time according to the defined show. The temporary override may exit and the defined show may resume at the current time of day after a predetermined amount of time has passed, at a reset time, or in response to a command.

17 Claims, 13 Drawing Sheets

Related U.S. Application Data

(60) Provisional application No. 63/051,492, filed on Jul. 14, 2020.

(56) References Cited

U.S. PATENT DOCUMENTS

| | | | |
|---|---|---|---|
| 7,663,325 | B2 | 2/2010 | McDonough et al. |
| 8,436,556 | B2 | 5/2013 | Eisele et al. |
| 8,630,741 | B1 | 1/2014 | Matsuoka et al. |
| 9,237,623 | B1 | 1/2016 | Lewis et al. |
| 9,392,660 | B2 | 7/2016 | Dias et al. |
| 9,392,663 | B2 | 7/2016 | Knapp et al. |
| 9,578,724 | B1 | 2/2017 | Knapp et al. |
| 9,655,214 | B1 | 5/2017 | Sooch et al. |
| 9,655,215 | B1 | 5/2017 | Ho et al. |
| 9,674,917 | B1 | 6/2017 | Sooch et al. |
| 9,763,303 | B2 | 9/2017 | Steiner |
| 9,795,000 | B1 | 10/2017 | Sooch et al. |
| 9,860,965 | B2 | 1/2018 | Recker et al. |
| 9,930,742 | B1 | 3/2018 | Sooch et al. |
| 10,159,130 | B2 | 12/2018 | Sooch et al. |
| 10,237,945 | B2 | 3/2019 | Sooch et al. |
| 10,331,167 | B2 | 6/2019 | Hunter et al. |
| 10,405,397 | B2 | 9/2019 | Sooch et al. |
| 10,624,171 | B2 | 4/2020 | Sooch et al. |
| 2002/0038157 | A1 | 3/2002 | Dowling et al. |
| 2006/0002110 | A1 | 1/2006 | Dowling et al. |
| 2006/0076908 | A1 | 4/2006 | Morgan et al. |
| 2007/0040512 | A1 | 2/2007 | Jungwirth et al. |
| 2008/0265799 | A1 | 10/2008 | Sibert |
| 2008/0297070 | A1 | 12/2008 | Kuenzler et al. |
| 2010/0084992 | A1 | 4/2010 | Valois et al. |
| 2010/0084996 | A1 | 4/2010 | Van De Sluis et al. |
| 2010/0182294 | A1 | 7/2010 | Roshan et al. |
| 2010/0244735 | A1 | 9/2010 | Buelow, II |
| 2011/0084614 | A1 | 4/2011 | Eisele et al. |
| 2011/0175546 | A1 | 7/2011 | Ramer et al. |
| 2012/0038291 | A1 | 2/2012 | Hasnain |
| 2012/0056545 | A1 | 3/2012 | Radermacher et al. |
| 2012/0080944 | A1 | 4/2012 | Recker et al. |
| 2012/0319597 | A1 | 12/2012 | Park et al. |
| 2013/0063042 | A1 | 3/2013 | Bora et al. |
| 2013/0082612 | A1 | 4/2013 | Kim et al. |
| 2013/0141018 | A1 | 6/2013 | Kamii |
| 2013/0218240 | A1 | 8/2013 | Feng et al. |
| 2013/0229113 | A1 | 9/2013 | Toda et al. |
| 2013/0257315 | A1 | 10/2013 | Restrepo et al. |
| 2014/0052220 | A1 | 2/2014 | Pedersen |
| 2014/0062297 | A1 | 3/2014 | Bora et al. |
| 2014/0070707 | A1 | 3/2014 | Nagazoe |
| 2014/0077707 | A1 | 3/2014 | Restrepo |
| 2014/0191688 | A1 | 7/2014 | King |
| 2014/0244044 | A1 | 8/2014 | Davis et al. |
| 2015/0035437 | A1 | 2/2015 | Panopoulos et al. |
| 2015/0062892 | A1 | 3/2015 | Krames et al. |
| 2015/0179031 | A1 | 6/2015 | Wallace |
| 2015/0237703 | A1 | 8/2015 | Patel |
| 2015/0301716 | A1 | 10/2015 | Madonna et al. |
| 2015/0327340 | A1 | 11/2015 | Siessegger et al. |
| 2015/0359061 | A1 | 12/2015 | Adler |
| 2015/0368967 | A1 | 12/2015 | Lundy et al. |
| 2015/0373796 | A1 | 12/2015 | Bahrehmand |
| 2015/0377699 | A1 | 12/2015 | Ho et al. |
| 2015/0382422 | A1 | 12/2015 | Ho et al. |
| 2016/0029464 | A1 | 1/2016 | Hughes et al. |
| 2016/0066383 | A1 | 3/2016 | Dias et al. |
| 2016/0066384 | A1 | 3/2016 | Dias et al. |
| 2016/0074620 | A1 | 3/2016 | Toda et al. |
| 2016/0120009 | A1 | 4/2016 | Aliakseyeu et al. |
| 2016/0234914 | A1 | 8/2016 | Chen |
| 2016/0286616 | A1 | 9/2016 | van de Ven |
| 2016/0295658 | A1 | 10/2016 | Chraibi et al. |
| 2016/0366746 | A1 | 12/2016 | van de Ven et al. |
| 2017/0098354 | A1 | 4/2017 | Loeb et al. |
| 2018/0054874 | A1 | 2/2018 | Hunter et al. |
| 2018/0075714 | A1 | 3/2018 | Sooch et al. |
| 2018/0077770 | A1 | 3/2018 | Sooch et al. |
| 2018/0077771 | A1 | 3/2018 | Sooch et al. |
| 2018/0077783 | A1 | 3/2018 | Sooch et al. |
| 2018/0177016 | A1 | 6/2018 | Sooch et al. |
| 2018/0228006 | A1 | 8/2018 | Baker et al. |
| 2019/0045602 | A1* | 2/2019 | Chen ............... H05B 47/115 |
| 2019/0124743 | A1 | 4/2019 | Sooch et al. |
| 2019/0215927 | A1 | 7/2019 | Sooch et al. |

FOREIGN PATENT DOCUMENTS

| | | |
|---|---|---|
| CN | 105430832 A | 3/2016 |
| EP | 2635093 A2 | 9/2013 |
| WO | 0199475 A1 | 12/2001 |
| WO | 2015188086 A1 | 12/2015 |

OTHER PUBLICATIONS

Office Action, Canadian Patent Application CA 3036805 A, dated May 25, 2021, 5 pages.

Lutron, "Wired SeeTouch QS Wallstation: Advanced Programming Mode", Lutron Electronics Co., Inc., Application Note #428, Revision A, Apr. 2012, pp. 1-18.

International Search Report and Written Opinion, International Application No. PCT/US2017/045742, Dec. 11, 2017.

Non-Final Office Action, U.S. Appl. No. 15/265,203, dated Jun. 26, 2017.

Notice of Allowance, U.S. Appl. No. 15/265,203, dated Nov. 14, 2017.

U.S. Appl. No. 13/970,990, filed Aug. 20, 2013.

U.S. Appl. No. 15/041,166, filed Feb. 11, 2016.

* cited by examiner

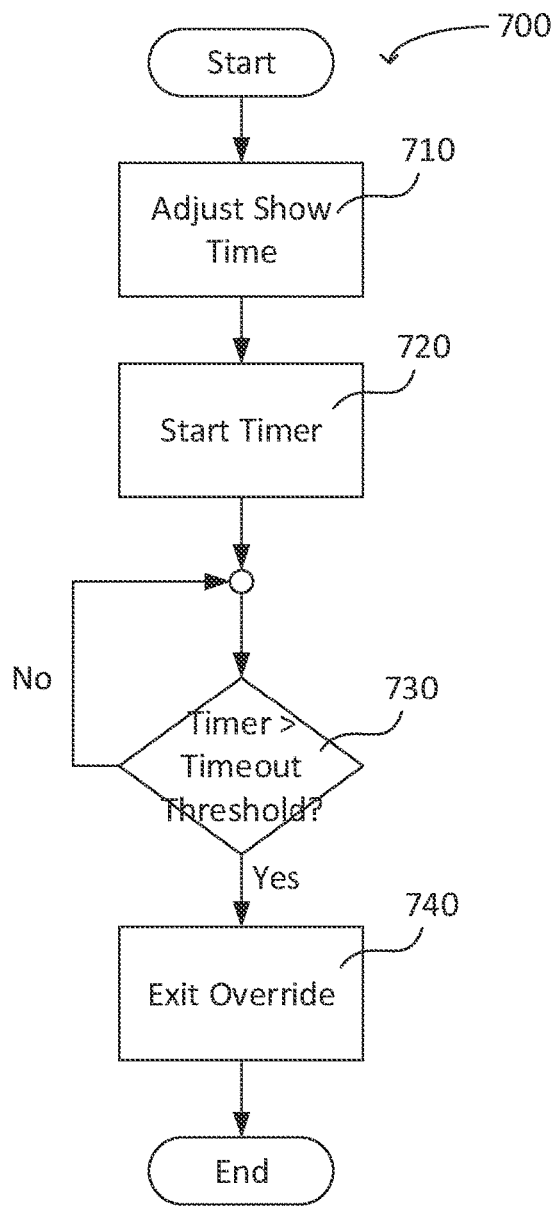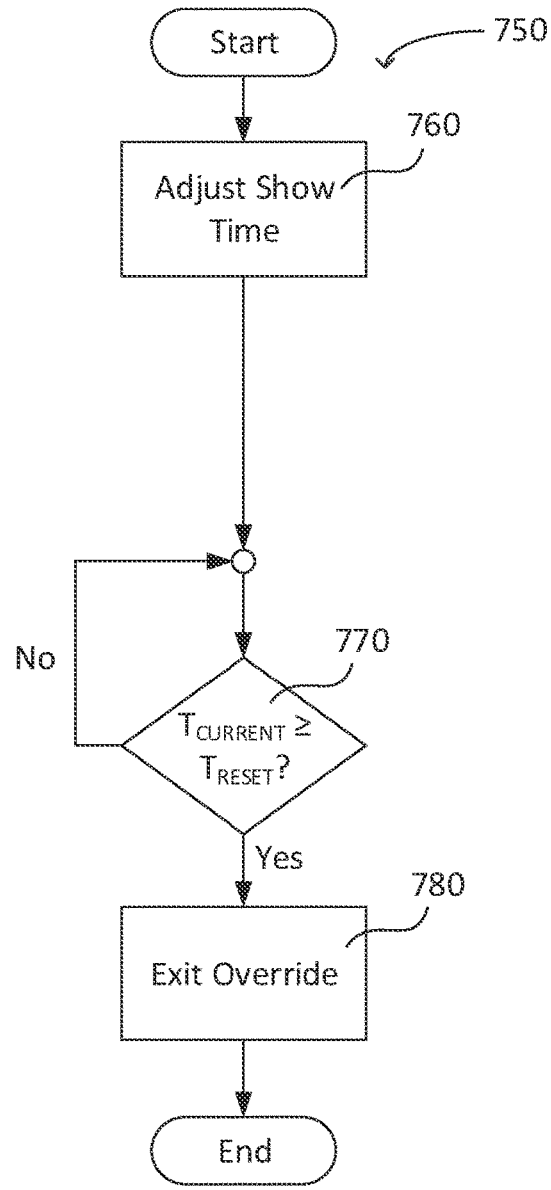
FIG. 7A
FIG. 7B

LIGHTING CONTROL SYSTEM WITH LIGHT SHOW OVERRIDES

CROSS-REFERENCE TO RELATED APPLICATION

This application is a continuation of U.S. patent application Ser. No. 17/375,682, filed Jul. 14, 2021; which claims the benefit of Provisional U.S. Patent Application No. 63/051,492, filed Jul. 14, 2020, the disclosure of which is incorporated herein by reference in its entirety.

BACKGROUND

Load control systems which automatically adjust the light output of one or more light sources gradually over time are known. An example commercial load control system, such as the Quantum system provided by Lutron Electronics Co., Inc., may be configured to adjust the light intensity based on a timeclock schedule (at time A, the lights go to intensity 1, at time B, the lights go to intensity 2). Residential systems, such as Home Works provided by Lutron Electronics Co., Inc., provide similar features. In another example, a load control system which may be configured to change color and intensity over time (i.e., throughout a day) to mimic light from the sun is the Natural Light system provided by Lutron Ketra.

SUMMARY

While such systems strive to simplify the control of light in a space by automating light output over time, sometimes the desired light output does not meet a user's task-specific needs. Therefore, there is a need for a system which provides an automated light output which is easily adjustable.

Described herein is a load control system comprising control devices configured to adjust one or more parameter values of light output as a function of a show time. The show time may be equal to a current time of day. The control devices may include lighting fixtures, window treatments, etc., which may control parameter values such as light intensity, color temperature, color, position of a window covering, etc.

The load control system may include one or more input devices, such as a keypad, network device, etc., which may be responsive to receiving a signal from a user comprising an adjustment in the show time from a user. For example, a user may actuate/press a button on an input device to rewind, forward, or change the show time of the natural show. The load control system may adjust the show time, such that the show time no longer tracks the current time of day, and control the control devices to adjust the parameter values accordingly. In this way, the parameter values may easily be adjusted to meet a user's task-specific needs while remaining on the natural show schedule to provide optimum light output.

BRIEF DESCRIPTION OF THE DRAWINGS

FIGS. 7A, 7B are example methods of exiting a system override of an adjusted show time of a natural show.

DETAILED DESCRIPTION

Figure 1:
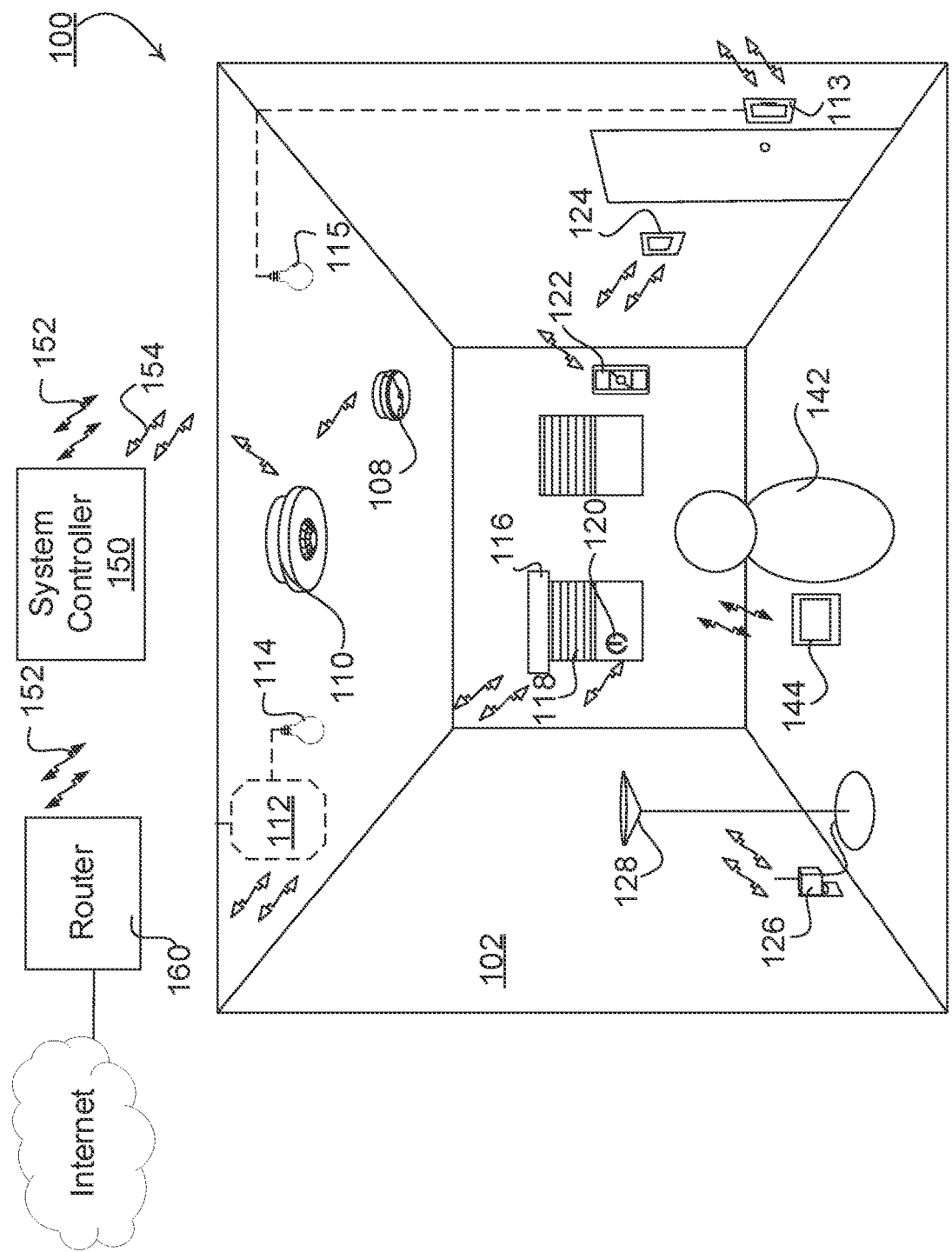
FIG. 1 is a system diagram that illustrates an example load control system that includes control-devices.

FIG. 1 shows a high-level diagram of an example load control system 100. Load control system 100 may include a system controller 150 and load control devices for controlling (e.g., directly and/or indirectly) one or more electrical loads in a user environment 102 (also referred to herein as a load control environment). Example user environments/load control environments 102 may include one or more rooms of a home, one or more floors of a building, one or rooms of a hotel, etc. As one example, load control system 100 may enable the automated control of lighting systems, shades, and heating, ventilating, and air conditioning (HVAC) systems in the user environment, among other electrical loads.

The load control devices of load control system 100 may include a system controller 150, control-source devices (e.g., elements 108, 110, 120, and 122 discussed below), and control-target devices (e.g., elements 112, 113, 116, 124, and 126 discussed below) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used. "Digital" messages will be used herein for discussion purposes only.

The control-source devices may include, for example, input devices that are configured to detect conditions within the user environment 102 (e.g., user inputs via switches, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on a configuration of the load control system, and to then transmit digital messages to the control-target devices for the control-target devices to then control respective electrical loads. In other words, the control-source devices and the control-target device may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router 160, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, a proprietary communication channel, such as CLEAR CONNECT™, or various mesh networks such as Zigbee or Thread, etc., to directly communicate. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first need to be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message(s) to the control-target device (directly or through the system controller). The association message from the control-source device may include a unique identifier of the control-source device. The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive configuration instructions from a user that specify which control-source devices should control which control-target devices. Thereafter, the system controller may communicate this configuration information to the control-source devices and/or control-target devices.

As one example of a control-target device, load control system 100 may include one or more lighting control devices, such as the lighting control devices 112 and 113. The lighting control device 112 may be a dimmer, an electronic switch, a ballast, a light emitting diode (LED) driver, and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages. For example, the lighting control device 112 may control parameters such as correlated color temperature (CCT), spectrum, vibrancy, etc., of the light produced by lighting load 114 (assuming lighting load 115 is configured to produce colored light). One will recognize that lighting control device 112 and lighting load 114 may be integral and thus part of the same fixture or may be separate.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115. Alternatively, one will recognize that the adjustment actuator may be used to control other parameters such as correlated color temperature (CCT), spectrum, vibrancy, etc., of the light produced by lighting load 115 (assuming lighting load 115 is configured to produce colored light).

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., thermostat) for directly controlling an HVAC system (not shown). The load control system 100 may also, or alternatively, include an audio control device (e.g., a speaker system) and/or a video control device (e.g., a device capable of streaming video content, such as a television). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device(s)). A control-target device may communicate such messages to confirm receipt of messages and actions taken, to report status (e.g., light levels), etc. Again, control-target devices may also or alternatively communicate via wired communications.

With respect to control-source devices, the load control system 100 may include one or more keypads and/or remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices for controlling an electrical load. The remote-control device 122 may send digital messages for controlling one or more control-target devices after actuation of one or more buttons on the remote-control device 122. One or more buttons may correspond to a preset scene for controlling the lighting load 115 and/or 114, for example. The occupancy sensor 110 may send digital messages to control-target devices in response to an occupancy and/or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the user environment 102. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level. The load control system 100 may include one or more other control-source devices. Again, one will recognize that control-source devices may also or alternatively communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. It may communicate programming/configuration information to the control devices. It may also be the source of control messages to control-target devices, for example, instructing the devices to control corresponding electrical loads. As one example of the later, the system controller may run one or more time-clock operations that automatically communicates messages to control-target devices based on configured schedules (e.g., commands to lighting control device 113 to adjust lighting load 115, commands to lighting control device 112 to adjust lighting load 114, commands to motorized window treatment 116 for directly controlling the covering material 118, etc.) For description purposes only, shades will be used herein to describe functions and features related to motorized window treatments. Nonetheless, one will recognize that features and functions described herein are applicable to other types of window coverings such as drapes, curtains, blinds, etc. Other examples are possible.

According to a further aspect of load control system 100, the system controller 150 may be configured to communicate with one or more network devices 144 in use by a user 142, for example. The network device 144 may include a personal computer (PC), a laptop, a tablet, a smart phone, or equivalent device. The system controller 150 and the network device 144 may communicate via a wired and/or wireless communications network. The communications network may be the same network used by the system controller and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router 160 local to the user environment 102. As another example, the system controller 150 and the network device 144 may communicate directly with one-another using, for example, Bluetooth, Wi-Fi Direct, etc. Other examples are possible, such as the system controller acting as an access point and providing one or more wireless/wired based networks through which the system controller and network device may communicate.

In general, the system controller 150 may be configured to allow a user 142 of the network device 144 to determine, for example, the configuration of the user environment 102 and load control system 100, such as rooms in the environment, which control devices are in which rooms (e.g., the location of the control devices within the user environment, such as which rooms), to determine the status and/or configuration of control devices (e.g., light levels, HVAC levels, shade levels), to configure the system controller (e.g., to change time clock schedules and reconfigure scenes), to issue commands to the system controller in order to control and/or configure the control devices (e.g., change light levels, change HVAC/temperature levels, change shade levels, change presets, etc.), etc. Other examples are possible.

The load control system 100 of FIG. 1 may be configured such that the system controller 150 is only capable of communicating with a network device 144 when that device is local to the system controller, in other words, for the two to directly communicate in a point-to-point fashion or through a local network specific to the user environment 102 (such as a network provided by a router 160 that is local to the user environment). It may be advantageous to allow a user of network device 144 to communicate with the system controller 150 and to control the load control system 100 from remote locations, such as via the Internet or other public or private network. Similarly, it may be advantageous to allow third-party integrators to communicate with the system controller 150 in order to provide enhanced services to users of user environment 102. For example, a third-party integrator may provide other systems within user environment 102. It may be beneficial to integrate such systems with load control system 100.

Figure 2:
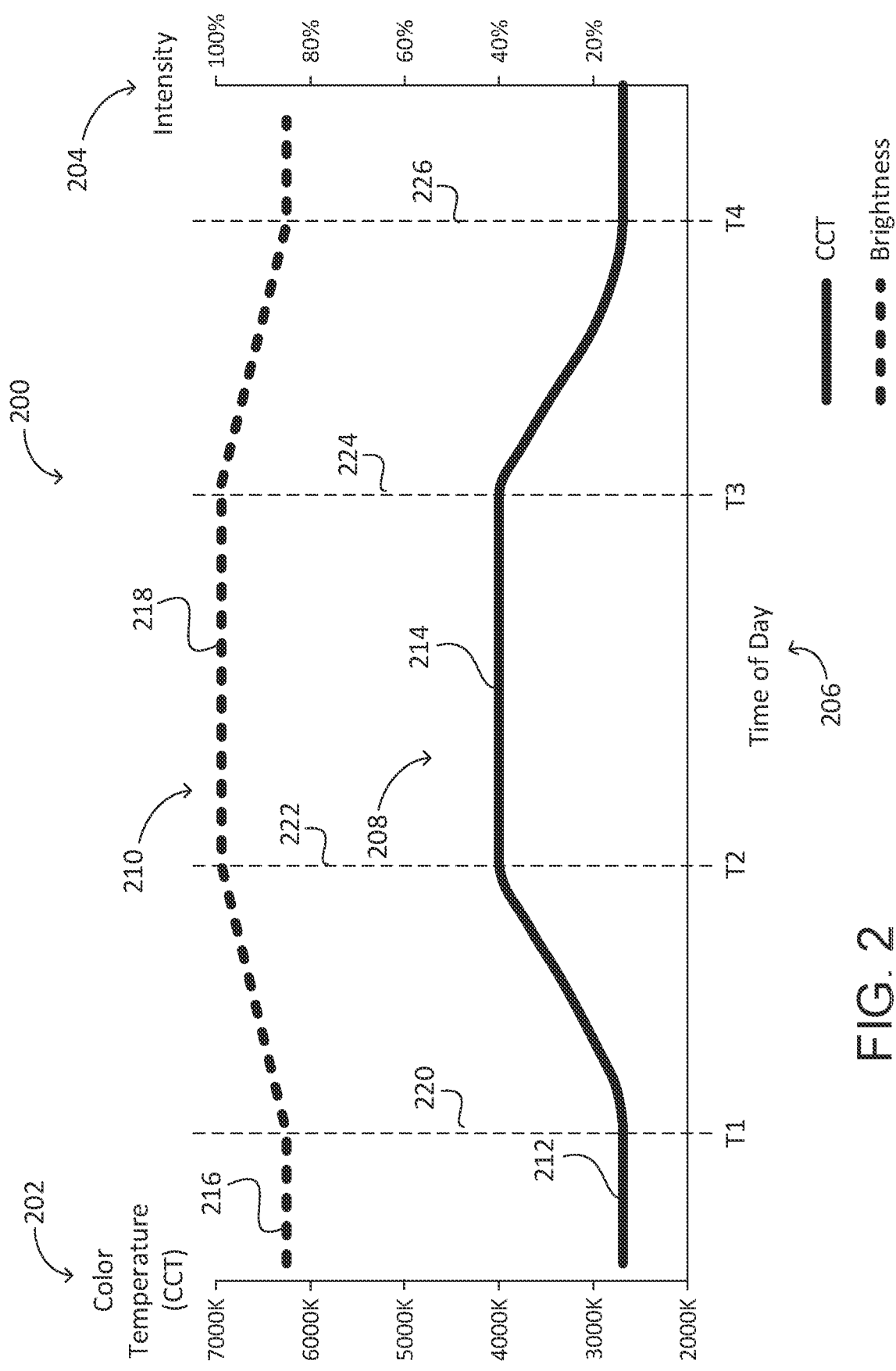
FIG. 2 is an example chart showing changes in color temperature over time and intensity over time.

Referring now to FIG. 2, there is shown an example graph 200 of a lighting show (which may also be referred to herein as a natural show) that may emulate, for example, natural light including sunrise and sunset, although other configurations are possible. In general, a "natural show" may refer to programmed changes in parameter values over time (i.e., time of day). Although FIG. 2 depicts various natural show curves for lighting parameters such as brightness and color temperature, which may be controlled by a lighting control device, other natural show curves may be included in the natural show to adjust different, or additional, parameters for one or more control devices (such as any of the control-target devices described herein). Parameter values may include, for example, light spectrum (e.g., power spectral density), vibrancy, temperature, position of a covering material/fabric of a window treatment, and/or control of audio and various multimedia (such as volume, on/off load state, etc.). For example, a thermostat or HVAC device may be integrated in the natural show to adjust temperature over time. Further, although the graph 200 is shown here for explanation purposes, one will understand that a similar graph may be displayed on a graphical user interface by a control application to a user via a network device. For example, the user may use the graphical user interface to enable and/or control the lighting functionality (also referred to herein as natural lighting functionality) for one or more lighting control devices where the lighting control devices control their respective lighting loads to produce light in accordance the lighting show of FIG. 2. The natural lighting functionality may change the color temperature and/or brightness/intensity of one or more lighting control devices/lighting loads in a preselected area to simulate a change in color temperature/brightness of natural lighting, for example, over the course of a period of time (e.g., a day, a portion of a day, etc.). The network device may communicate with the lighting control devices via a system controller as described herein. For example, the natural lighting functionality may be defined at the network device and stored at the system controller for being implemented in the lighting control devices in a preselected area. Alternatively, the network device may communicate directly with the lighting control devices, e.g., via Bluetooth Low Energy (BLE).

The natural lighting functionality may be enabled for the predefined area when an enable button is activated on a keypad or an application on a network device, and the natural lighting functionality may be disabled when the enable button is deactivated. Additionally and/or alternatively, the natural lighting functionality may be enabled/disabled via one or more timeclock events. The graph 200 may include one or more x axes and/or y axes. For example, the graph 200 may include a correlated color temperature (CCT) axis 202, an intensity axis 204, and/or a time axis 206.

The color temperature axis may represent a color temperature to which one or more lighting control devices (e.g., one or more LED lights) within an area (e.g., a room within a building) may be controlled. The color temperature axis may be a range of a number of color temperatures along the black body curve. For example, the color temperature axis may range from 2000K to 7000K, or another range therein. The color temperature axis may be located as a y-axis on the left-hand side of the graph 200 as shown, though the color temperature axis may be located on other portions of the graph (e.g., the right-hand side of the graph).

The intensity axis may represent a brightness to which the lighting control devices within the area may be controlled. The intensity axis may range from, for example, 0% to 100%. The intensity axis may be located as a y-axis on the right-hand side of the graph, though the intensity axis may be located on other portions of the graph (e.g., the left-hand side of the graph).

The color temperature and brightness may be controlled over time according to the curves defined by the graph 200. For example, the color temperature of the lighting control devices may have a CCT curve 208 which defines the changes in color temperature with respect to time. Additionally, the intensity of the lighting control devices may have a brightness curve 210 which defines the changes in intensity with respect to time.

The time axis may display a time of day in a number of predefined or user-defined increments. The length of the time axis may represent the length of a day, or a portion of the day. For example, the time axis may begin at midnight and end at midnight of the next day. In another example, the time axis may represent a period of time over which the lighting control devices may be turned on, or the period of time that the natural lighting functionality may be enabled, such as a period of time between 6:00 a.m. and 6:00 p.m. Further, the time of day 206 shown in FIG. 2 may be a show time, that is, a system time for the natural show. The time of day 206 may be equal to a current time of day, for example. The load control system may maintain a system time that corresponds to times at which to play a scene (i.e., go to specific parameters as defined by the curves of the natural show).

As shown, the brightness and color temperature to which the lighting control devices may be controlled may change based on the time of day according to the brightness curve 210 and color temperature curve 208. For example, the color temperature may be cooler between times T2 and T3 (for example, between 10:00 a.m. and 3:00 p.m.), compared to the color temperature at times T1 and T4 (e.g., at dawn and sunset). The brightness of the lighting control devices may also change based on the time of day. One will understand that brightness curve 210 and CCT curve 208 are shown for example only, and that curves of alternative or additional parameter values which change over time may be part of a natural show. Further, one or more elements of the load control system (i.e., a control-source device, control-target device, for example) may store portions of the natural show (e.g., a parameter value corresponding to system time) in a memory, which may be recalled and implemented at the corresponding system time. One or more thresholds may be set on the time axis for a starting time and/or an ending time at which changes may be made to the intensity and/or color temperature. For example, the color temperature of natural light provided in a space by the lighting control devices may ramp up earlier in the day (e.g., toward a cooler color temperature, for example to simulate sunrise) and may ramp down later in the day (e.g., toward a warmer color temperature, for example to simulate sunset). The thresholds may be indicated on the graph 200 by dotted vertical lines. For example, as shown in FIG. 2, the graph 200 may include a "Start Ramp Up" threshold 220 at T1, an "End Ramp Up" threshold 222 at T2, a "Start Ramp Down" threshold 224 at T3, and an "End Ramp Down" threshold 226 at T4.

Between the time of day indicated by the "Start Ramp Up" threshold T1 and the time of day indicated by the "End Ramp Up" threshold T2, the color temperature of the lighting control devices may increase from a minimum color temperature 212 until a maximum color temperature 214 is met. Between the time of day indicated by the "Start Ramp Up" threshold T1 and the time of day indicated by the "End Ramp Up" threshold T2, the brightness of the lighting control devices may increase from a minimum brightness level 216 until a maximum brightness level 218 is met. For example, the "Start Ramp Up" threshold T1 may be set to 6:00 a.m. and the "End Ramp Up" threshold T2 may be set to 9:00 a.m. From the time period between the "Start Ramp Up" threshold T1 and the "End Ramp Up" threshold T2, the color temperature of the lighting control devices may increase from 2800K to 4000K and the brightness may increase from 85% to 100%.

Similarly, between the time of day indicated by the "Start Ramp Down" threshold T3 and the time of day indicated by the "End Ramp Down" threshold T4, the color temperature and/or the brightness of the lighting control devices may decrease from the maximum color temperature/brightness until the minimum color temperature/brightness is met. For example, the "Start Ramp Down" threshold T3 may be set to 5:00 p.m. and the "End Ramp Down" threshold T4 may be set to 8:00 p.m. Between the time of day indicated by the "Start Ramp Down" threshold T3 and the time of day indicated by the "End Ramp Down" threshold T4, the color temperature of the lighting control devices may decrease from 4000K to 2800K and the brightness may decrease from 100% to 85%. The color temperature/brightness of the lighting control devices may change linearly, step-wise, according to a sigmoid function (e.g., as shown in FIG. 2), etc. The time periods (as noted by T1, T2, T3, and T4) over which the color temperature/brightness of the lighting control devices increases or decreases may be automatically set or may be user-selected. The time periods over which the color temperature/brightness of the lighting control devices increases or decreases may default to sunrise/sunset times at the location of the lighting control devices, and may be modified by the user. The lighting control devices may have a default minimum/maximum color temperature 212, 214 and/or a default minimum/maximum brightness 216, 218. The default color temperature settings and/or brightness levels may depend on the types of lighting control devices implemented in the predefined zone or area.

A user may manually adjust one or more parameters of the natural show while the natural show is activated and lighting control devices are being controlled according to the show. For example, a user may change the intensity and/or color temperature of the show by pressing one or more buttons on a keypad, mobile device, etc., to increase or decrease the intensity, color temperature, etc., of the show for a given area. The color temperature and the brightness may each change as a function of the time of day. Additionally, the color temperature may change as a function of the brightness based on a user's adjustment of the intensity. For example, if a user were to decrease intensity (and therefore brightness) at time T4, the color temperature may also become warmer (i.e., warm dim), whereas, if a user where to decrease intensity at time T3, the color temperature may not substantially change. Examples of changing color temperature as a function of time of day and brightness are described in more detail in U.S. Pat. No. 9,795,000, issued Oct. 17, 2017, entitled "ILLUMINATION DEVICE, SYSTEM AND METHOD FOR MANUALLY ADJUSTING AUTOMATED CHANGES IN EXTERIOR DAYLIGHT AMONG SELECT GROUPS OF ILLUMINATION DEVICES PLACED IN VARIOUS ROOMS OF A STRUCTURE", the contents of which are hereby incorporated by reference in its entirety.

The natural show may provide intuitive natural light for a user through a day which may mimic the natural light of the sun, and may further optimize color rendering index (CRI). The natural show may further optimize metrics such as circadian stimulus (CS), or other metrics, for example, equivalent melanopic lux (EML). Additionally, the natural show may be configurable for personal and situational preferences. For example, an early riser may adjust the natural show to start earlier in time, or a certain user may prefer an overall cooler CCT experience. The natural show may be adjusted and tweaked to be tailored to specific users given the examples above.

The natural show curves (for example, CCT, brightness) may be stored in memory and recalled at various times as the show changes over time with respect to the show/system time. Although the natural show depicted in FIG. 2 is shown for a lighting control device with curves for brightness and CCT, other control devices may be responsive to a natural show and changing various parameters over time. For example, for a lighting control device, additional parameters such as vibrancy, spectrum (i.e., power spectral density), etc., may also have corresponding curves with parameter values that change with respect to the show time of the natural show. In another example, control devices such as motorized window treatments, audio and/or video devices, temperature control devices, etc., may also be a part of the natural show with their own curves for adjusting parameters such as a position/level of a window covering, volume, audio station/type of audio content, video station/type of video content, load state (e.g., on/off control of a television), room temperature, etc., with respect to the show/system time. Other examples are possible.

After the natural show has been created and programmed, a user may adjust the natural show as needed in specific scenarios. For example, the show/system time of the natural show may be equal to a current time of day; however, a user may shift the show/system time of the natural show with respect to the current time of day in order to effectively change the brightness and/or color temperature of the natural show to return to a previous (or forward to a future) brightness and/or color temperature of the natural show in accordance with the graph. For example, the natural show (that is, the predefined color/brightness gradual adjustments in a series of scenes over time as shown by the graph of FIG. 2 for example) may have been configured at the time of system setup to provide appropriate bright light and color temperature for a user who typically returns home and prepares dinner around 6:00 p.m. However, when a user returns home at a different time, for example, 8:00 p.m., the user may adjust (i.e., temporarily adjust) the system time of the natural show by two hours, for example, such that the lighting control devices output light corresponding to the scene (CCT and intensity, for example) that is programmed to play at 6:00 p.m.

Figure 3B:
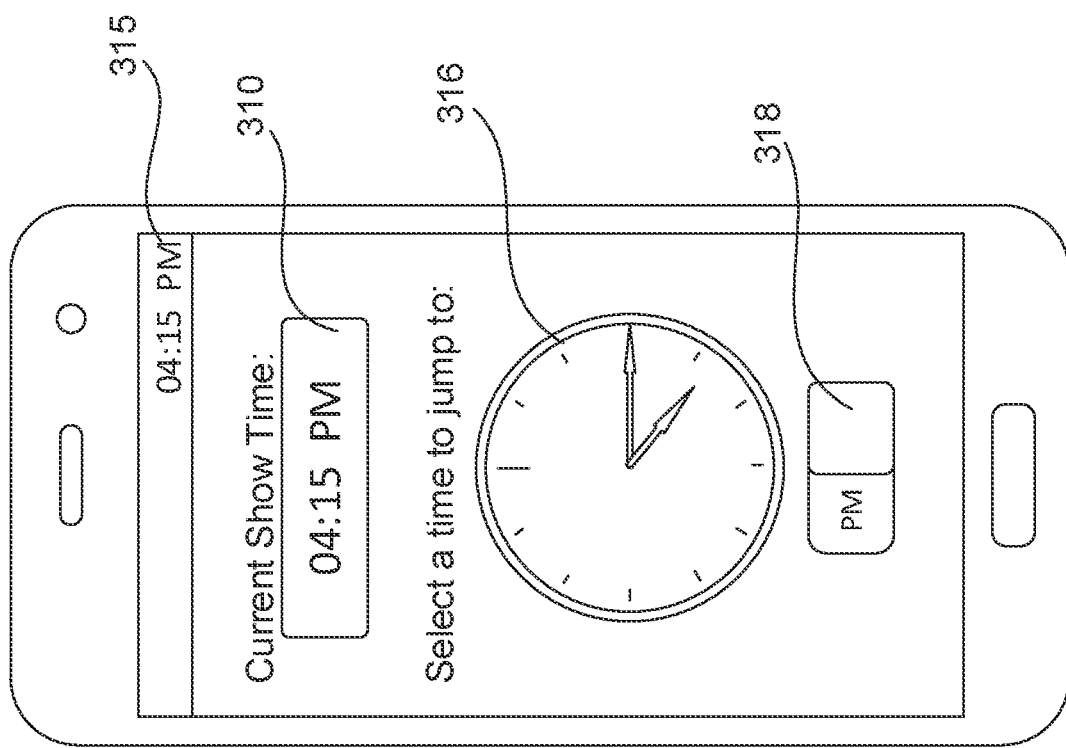
FIGS. 3A, 3B show example graphical user interfaces of a mobile application which may allow a user to temporarily adjust the settings of the natural show.
Figure 3A:
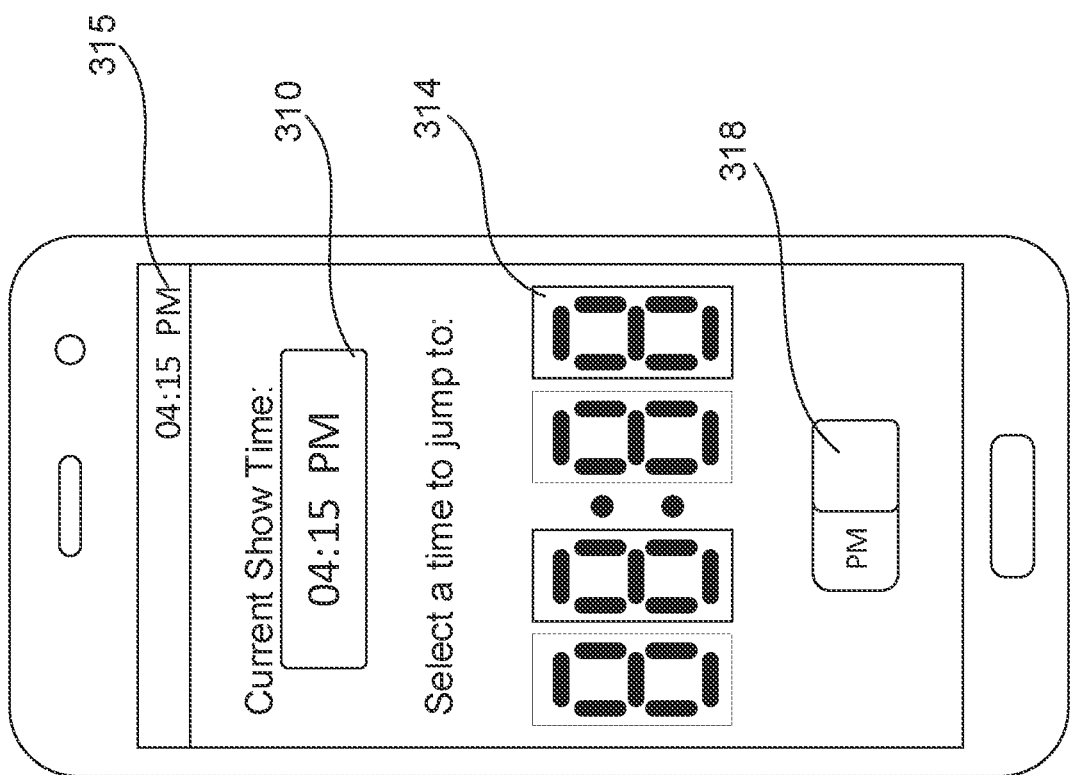

FIGS. 3A and 3B show two example graphical user interfaces (GUIs) of a mobile application on respective network devices (such as network device 144 of FIG. 1, for example). The example mobile application may allow a user to temporarily adjust the settings of the natural show. For example, the GUI may indicate the current show time 310 (i.e., the system time). During normal operation of the natural show, the show time 310 may be equal to the actual time of day 315. The mobile application may provide a user with the option to adjust the current show time. For example, FIG. 3A shows a digital clock 314 that a user may actuate (i.e., press) or swipe to adjust the system time 310. According to another example, FIG. 3B shows an analog clock 316 having one or more hands (i.e., minute, hour, etc.), that a user may manually press and drag to adjust the system time 310.

The mobile application may further include a slider, for example slider 318, to indicate whether the adjusted time refers to a.m. or p.m. For example, a user may drag the slider 318 to the right to indicate a p.m. time, or the user may drag the slider to the left to indicate an a.m. time. One will understand that the GUIs shown here are presented as examples only, and that other GUIs that provide similar functionality of adjusting the current show time are considered within the scope of this disclosure. For example, the show time may be depicted as a 24-hour clock rather than a 12-hour clock with a.m. and p.m. times. Other examples are possible.

Figure 4:
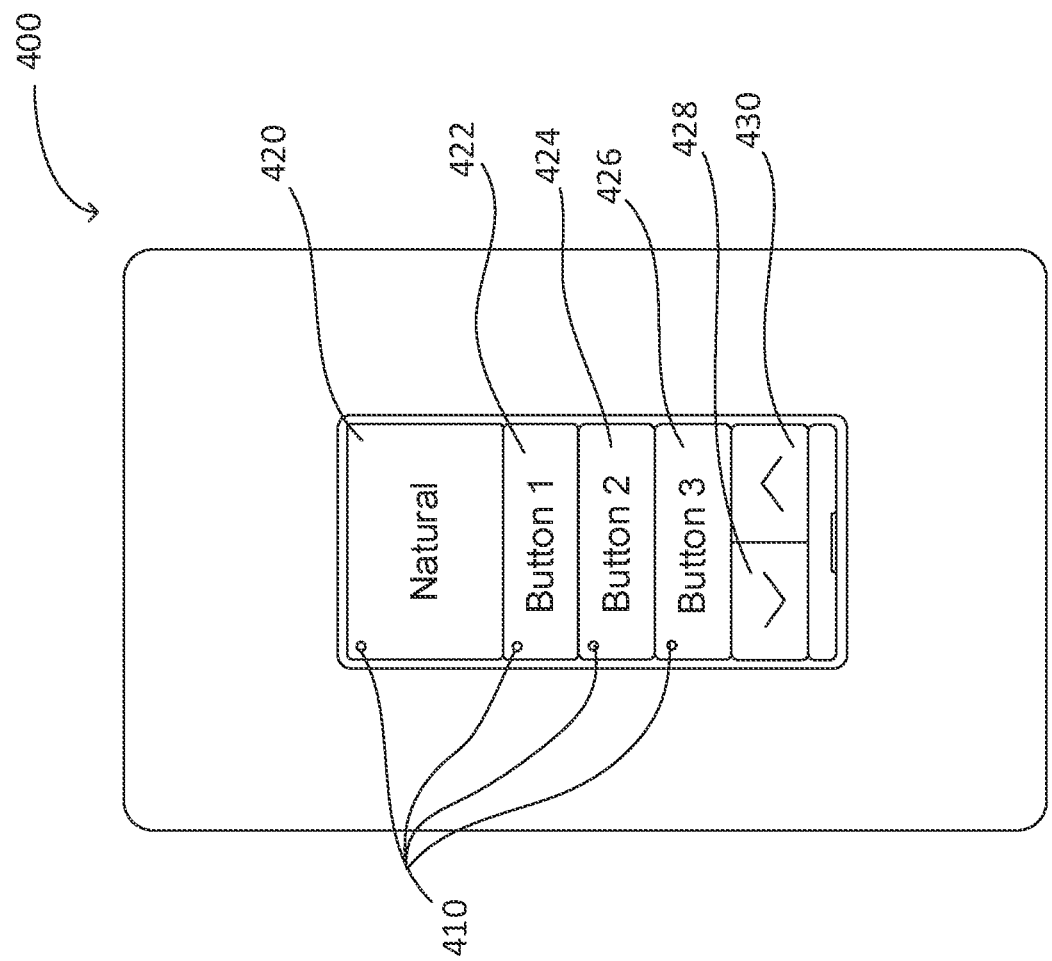
FIG. 4 is an example keypad which may allow a user to temporarily adjust the settings of the natural show.

FIG. 4 is an example of a keypad 400 which may allow a user to temporarily adjust the settings of the natural show. The keypad 400 may be used instead of, or alternatively to, the mobile applications shown in FIGS. 3A and 3B.

The keypad 400 may have a plurality of buttons 420-430. For example, the button 420 may be configured to toggle the natural show on and off. When a user actuates the button 420 to toggle the natural show on, the natural show may begin to play at a system time equal to the current time of day. When a user actuates the button 420 a second time to toggle the natural show off, the natural show may cease adjusting the parameter values in time and may maintain the parameter values over time (i.e., maintain static parameter values).

The buttons 422-426 may indicate specific static scenes (i.e., having static parameter values that do not change in time). When a user actuates one of the static scene buttons 422-426 while the natural show 420 is enabled, the natural show may turn off in favor of the static scene. For example, the keypad may transmit a scene command to one or more control-target devices and/or the system controller to cause the control-target devices to change parameter values according to the defined static scene. For example, the static scene may have one or more static parameter values, such as a defined light intensity and color temperature output which does not change over time. For example, button 422 may correspond to a wake-up scene with high light intensity and high (cool) color temperature, button 424 may correspond to a dinner scene with medium light intensity and medium color temperature, and button 426 may correspond to a bedtime scene with very low light intensity and low (warm) color temperature. One will understand that static scenes may also include parameter values (i.e., static parameter values which do not change over time) for other types of control devices, such as thermostats (temperature), audio devices (volume), and televisions (on/off load state). Other examples are possible.

Each of the buttons 420-426 may include a light indicator 410 (for example, a light-emitting diode). The respective light indicator 410 may turn on (i.e., illuminate) in response to an actuation of the respective button 420-426. In this way, the light indicators 410 may indicate which button (or scene) is currently activated. For example, when a user presses button 442, the corresponding light indicator 410 may turn on.

Buttons 428 and 430 may be used to manually adjust the natural show. For example, a user may manually press button 428 to rewind the natural show (i.e., move the current show backwards in time), and may manually press button 430 to forward the natural show (i.e., move the current show forwards in time). According to a first example, a user may press and hold one of the buttons 428, 430 to rewind/forward the natural show, respectively, in real time. When the button 428 or 430 is pressed, the show time of the natural show (that is, the system time) may begin to adjust with respect to the current time of day, thereby adjusting the color and/or intensity of the light output in the space, giving the user instantaneous feedback of the adjustment. For example, the color and/or intensity of the light output (and/or other parameters) may adjust in time along the natural show curves, for example, the CCT curve 208 and brightness curve 210 shown in FIG. 2. According to a second example, a user may press one of the buttons 428, 430 one or more times to rewind/forward the show time of the natural show, respectively, in pre-defined increments. For example, a user may press buttons 428 or 430 once to rewind/forward the show time of the natural show by 15 minutes, twice for 30 minutes, etc. One will understand that other increments may be used (30 minutes, 1 hour, etc.). Further, the increment of time by which the show time of the natural show may be adjusted may be programmable/configurable by the user.

According to another example, buttons 428, 430 may be associated with decreasing and increasing intensity, respectively, to change the show/system time (i.e., changing color temperature and intensity of the light output while following the brightness and color temperature natural show curves over time defined by the natural show, for example, as shown in FIG. 2). Changing the intensity by following the natural show dimming curve (i.e., also changing corresponding color temperature) may provide an improved aesthetic of the light output and better light quality compared with a manual adjustment of the light intensity of the natural show.

The direction (rewind/forward) in time, as well as the increment of time to change, may depend on the pre-defined and programmed dimming curve over time for the natural show. To create this change in intensity and color by adjusting the show time, buttons 428 and 430 may change in function based on time of day. For example, when a user presses button 428 to decrease the intensity, at a first time of day, the show time may rewind with respect to the current time of day to produce the desired output. However, when a user pressed button 428 to decrease the intensity at a second time of day, the show time may move forward with respect to current time of day to produce the desired output, as will be discussed in greater detail herein.

In addition to the embodiments described herein, keypad 400 may be used as part of a GUI for a mobile application, such as the GUIs shown in FIGS. 3A and 3B, for example. Other examples are possible.

Figure 5A:
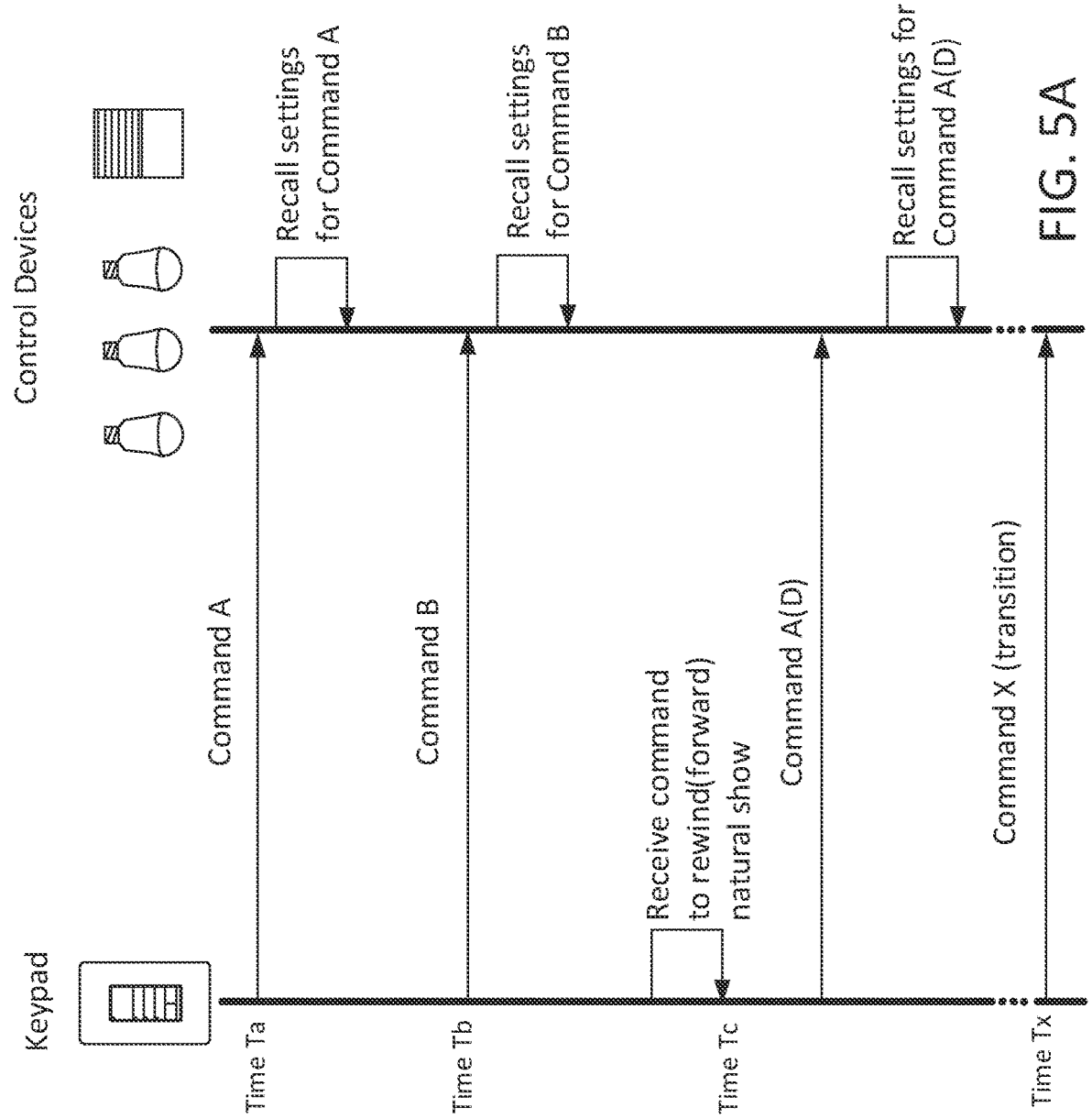
FIGS. 5A, 5B are example system flow diagrams of a natural show in a load control system.

FIG. 5A is an example system flow diagram of a natural show in a load control system. The load control system depicted may have a control-source device (i.e., an input device such as a keypad or network device, for example) which transmits commands to one or more control-target devices (shown as control devices that control lighting loads and/or a window treatment, for example). A keypad will be used herein as an example.

According to this example, the control-target devices may change one or more parameters of their respective loads based on receiving a command from the control-source device. The control-source device may send commands to the control-target devices at discrete system times of the natural show based on the natural show curves, for example, as shown in FIG. 2. For example, at a first time of day $T_a$, the keypad may transmit Command A to the control devices. In response to receiving Command A, the control devices may adjust the light output according to the received Command A. For example, the control devices may adjust the respective color temperature and/or intensity outputs of their respective lighting loads for the given command based on the show time of the natural show, and the window treatment may adjust a level of the window covering based on the given command and the show time of the natural show.

At a second time of day $T_b$, the keypad may transmit Command B to the control devices. In response to receiving Command B, the control devices may adjust the light output according to the received Command B. For example, the control devices may adjust the respective color temperature and/or intensity outputs of their respective lighting loads for the given command based on the show time of the natural show, and the window shade may adjust a level of the window covering based on the given command and the show time of the natural show.

Sometime after time of day $T_b$ and before time of day $T_c$ occurs, the keypad (or other control-source device or input device) may receive a command (from a user for example) to either rewind or forward the natural show (that is, a request to adjust the show time of the natural show with respect to the actual time of day). In response to receiving the command to rewind (or forward) the natural show, the keypad may send an adjusted command. For example, the keypad may send Command A to rewind the natural show (back to time $T_a$), or may send Command D to forward the natural show (forward to time $T_D$). In response to receiving Command A or Command D, respectively, the control devices may recall the settings for Command A or Command D and may adjust the light output of their respective lighting loads according to the received Command A or Command D.

The adjusted natural show may continue to play at the adjusted show/system time until a timeout condition occurs which causes the show/system time to reset to match the actual time of day. When the timeout condition occurs, the keypad may send a Command X (e.g., corresponding to current time of day $T_x$), and the control devices may recall the settings for Command X and resume the natural show in accordance with the actual time of day (i.e., reset the show time from the adjusted show time to equal the current/actual time of day).

According to a first example, the Commands A-X shown here may comprise commands to go to a specific parameter value (e.g., intensity, color temperature, or window covering level). In another example, the Commands A-X may comprise a show time, and the control devices may receive the show time, and based on the received show time, determine respective parameter values (e.g., color temperature, intensity, and/or window covering level(s)) corresponding to the received show time by recalling the parameter values from memory, for example, from a stored lookup table.

Figure 5B:
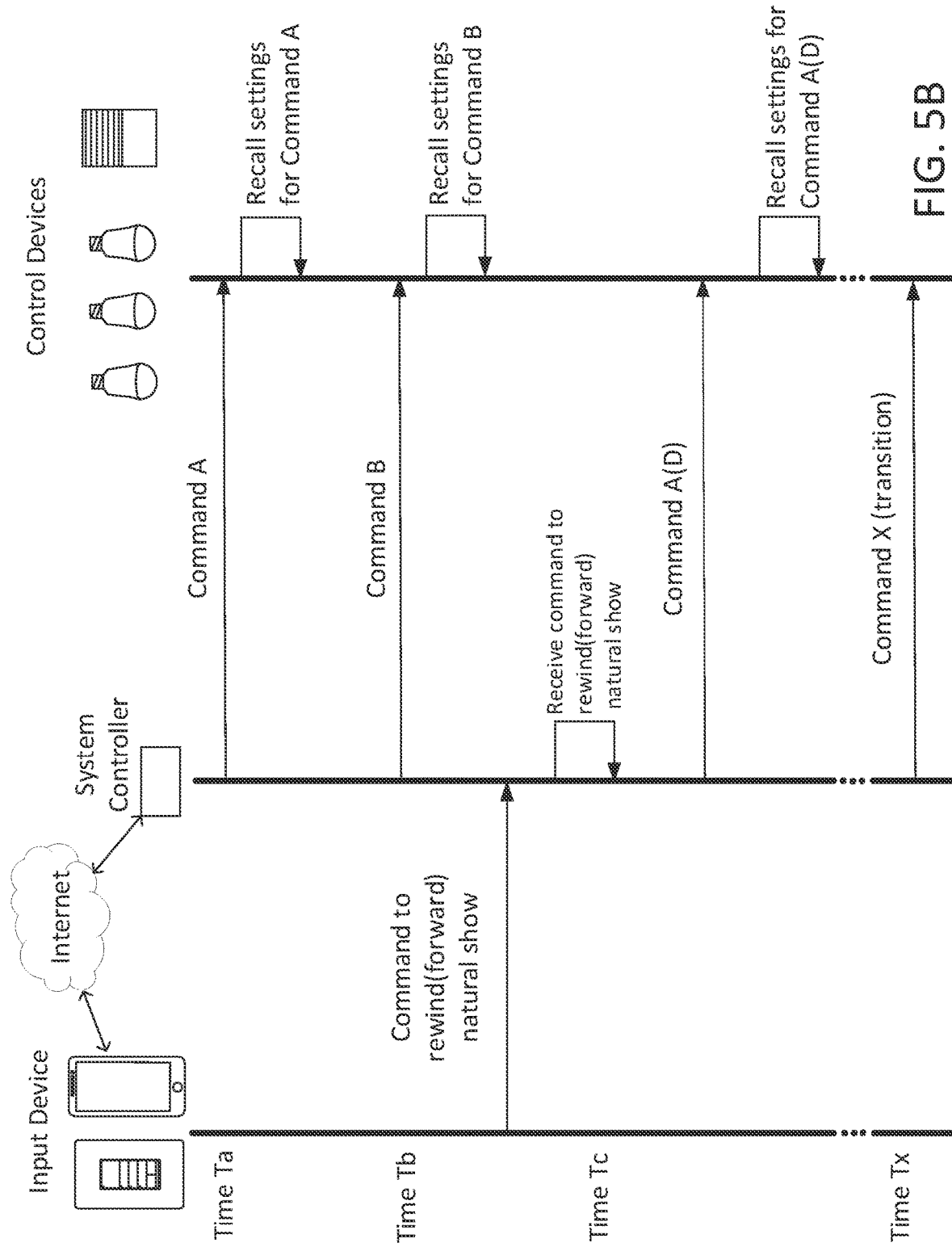

FIG. 5B is an example system flow diagram of a natural show in a load control system. FIG. 5B may have similar elements as FIG. 5A, for example, including one or more input devices (control-source devices) which may include a keypad, a network device, etc., as shown, and one or more control-target devices (shown as control devices that control lighting loads and/or a window treatment, for example).

The system of FIG. 5B may additionally include a system controller. The system controller may be configured to receive commands from the input device(s). For example, the system controller may receive commands directly from the keypad as shown. Alternatively, the system controller may receive commands from the network device via a wired and/or wireless communications network (e.g., via a wireless router, such as router 160 shown in FIG. 1).

In the system of FIG. 5B, the system controller (rather than the keypad of FIG. 5A) may be configured to transmit commands to the control devices. That is, the system controller may keep track of the current system/show time for the natural show. For example, at a first time of day $T_a$, the system controller may transmit Command A to the control devices. In response to receiving Command A, the control devices may adjust the light output of their respective lighting loads according to the received Command A. For example, the control devices may adjust the respective color temperature and/or intensity outputs of their respective lighting loads for the given command based on the show time of the natural show, and the window treatment may adjust a level/position of the window covering based on the given command and the show time of the natural show.

The natural show may progress forward with the system time as the system controller sends Command B at time $T_b$, and the control devices respond to the Command B as previously described for FIG. 5A. Sometime between time $T_b$ and time $T_c$, one of the input devices (keypad, network device, etc.) may receive an actuation indicating a command to rewind or forward the natural show (i.e., to adjust the system time with respect to the current time of day). The input device may then transmit a command to rewind or forward the natural show to the system controller.

The system controller may receive and interpret the command from the input device. For example, the command may include which button has been pressed on a keypad, an amount of time (or number of times) a button has been pressed on the keypad (the keypad may include, for example, the keypad shown in FIG. 4). The system controller may interpret the command to correlate the amount of time (or number of times) the button has been pressed with an amount of time by which to adjust the natural show relative to the time of day. In another example, the command received by the system controller from the input device may comprise a desired show time which the user wishes to adjust the current show/system time to. The show time may be received from a network device, as shown in FIGS. 3A and 3B, for example. Other examples are possible.

In response to receiving and interpreting the command to rewind (or forward) the natural show, the system controller may transmit an adjusted command. For example, the system controller may send Command A to rewind the natural show (back to time $T_a$), or may send Command D to forward the natural show (forward to time $T_D$). In response to receiving Command A or Command D, respectively, the control devices may adjust the light output of their respective lighting loads according to the received Command A or Command D.

The adjusted natural show may continue in time (as described for FIG. 5A) until a timeout condition occurs which causes the show time to reset to match the actual time of day. When the timeout condition occurs, the system controller may send a Command X (e.g., corresponding to time of day $T_x$), and the control devices may resume the natural show in accordance with the actual time of day.

As previously described for FIG. 5A, the Commands A-X transmitted by the system controller to the control devices may comprise commands to go to a specific intensity, color temperature, and window covering level. In another example, the Commands A-X may comprise a system/show time, and the control devices may receive the show time, and based on the received show time, determine respective color temperature, intensity, and/or window covering level(s) corresponding to the received show time by retrieving such values from memory, for example, as shown in FIG. 5B. According to another example, the control devices may recall stored parameters of the natural show based on the current/actual time of day, and may be responsive to one or more triggers to adjust the show time. For example, the control devices may play the natural show and operate independently of the system controller commands, and may receive (directly or via the system controller) the command to adjust the show time. The control devices may then adjust the respective parameters of the natural show according to the new show/system time until a timeout condition or trigger occurs which causes the control devices to reset the system time to the actual time of day.

Figure 6A:
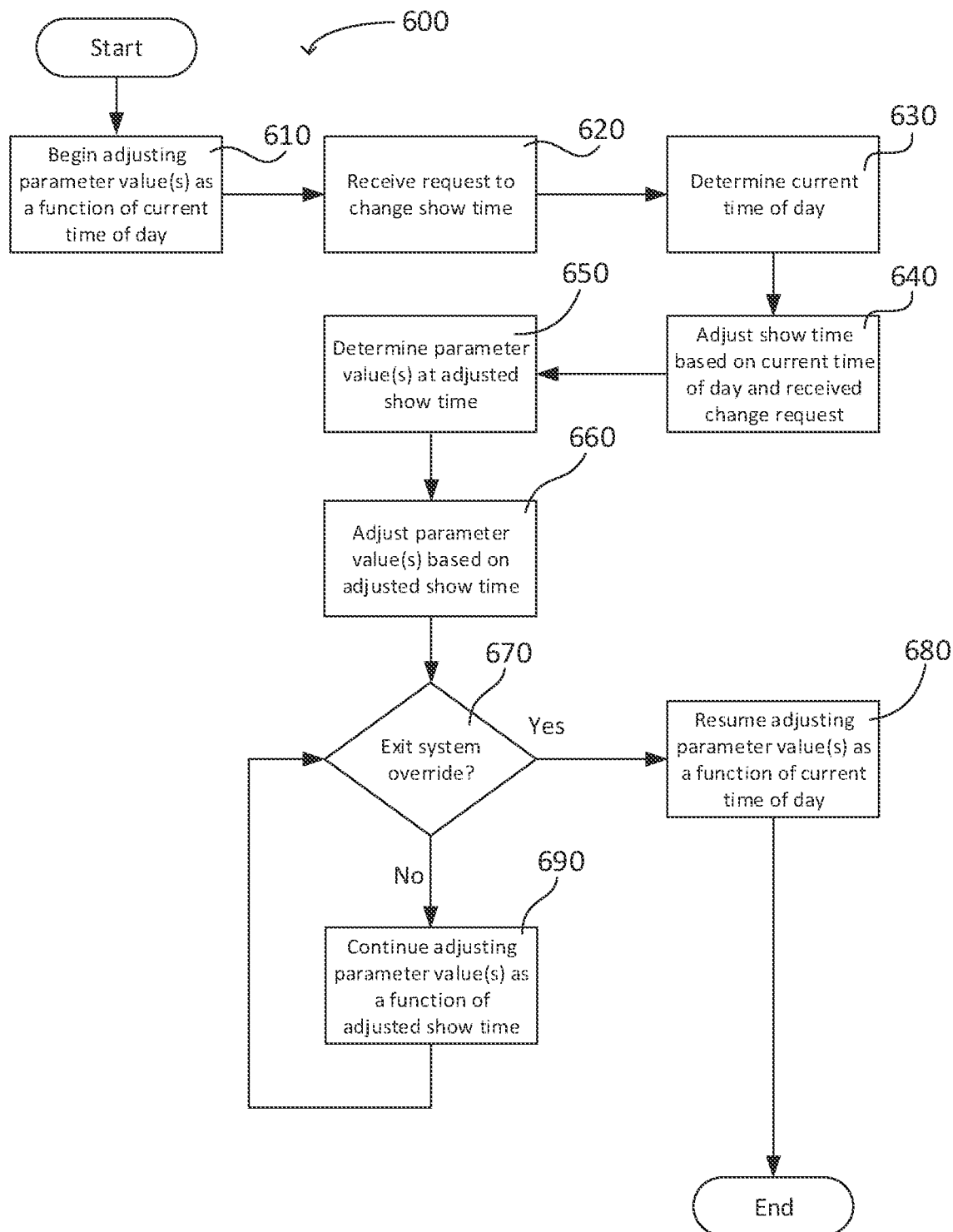
FIGS. 6A, 6B are example methods of a system override adjusting a show time of a natural show.

FIG. 6A is an example method 600 for adjusting a show time of a natural show with respect to a time of day, corresponding with FIGS. 5A and 5B. The method 600 will generically be described as being performed by a device, which will be understood by one of ordinary skill as any of the various components of the load control system, e.g., one or more input devices, the system controller, and one or more control-target devices. The method 600 may start at step 610 with the natural show, which may be initiated, for example, in response to a button press. The control devices (i.e., control-target devices such as one or more light sources, window treatment, etc.) may begin adjusting parameter value(s) (e.g., CCT, intensity, position of a covering material of the window treatment, etc.) as a function of the time of day (i.e., the show time, $T_{SHOW}$) in response to the button press. The parameter value(s) referred to herein may include, but are not limited to: light intensity, color, light spectrum (e.g., power spectral density), color temperature, vibrancy, room temperature, position of a covering material/fabric of a window treatment, and control of audio and various multimedia (such as volume, on/off load state, etc.). The show time $T_{SHOW}$ may be equal to the current time of day, $T_{ACTUAL}$:

$$T_{SHOW} = T_{ACTUAL} \quad [1]$$

The show time $T_{SHOW}$ may continue in time matching the current time of day $T_{ACTUAL}$ according to the above equation [1], with the control devices adjusting their respective parameter value(s) in response to the changes in show time as shown in FIGS. 5A and 5B as Commands A, B are sent and the respective settings are recalled, for example, in response to the received commands or as internally determined by the control devices.

At step 620, one of the devices in the load control system may receive a request from a user to change the show time. For example, an input device, such as a keypad or a network device, may receive the request via an actuation of a button or input from a mobile application. The request to change the show time may be made by a user actuating or pressing a button multiple times to increase (decrease) the show time, or to press and hold the button to change the show time. The number of button actuations/presses or the duration of time the button is actuated/pressed (on a keypad or network device, for example) may be used to calculate the corresponding desired change in show time with respect to the time of day. This calculation may be done internally to the input device, at the system controller, and/or by the control-target devices.

According to a first example, the request to change show time may be a request to increase the show time by an amount $\Delta T_{INC}$ (as transmitted by the input device or as determined by the system controller and/or the control-target devices). According to a second example, the request may be to decrease the show time by an amount $\Delta T_{DEC}$. According to a third example, the request may be to go to a specific show time, $T_{SHOW\_NEW}$.

In response to the request, the method may continue at step 630 by determining a current time of day $T_{ACTUAL}$. Step 630 may be implemented by the input device, the system controller, or the control target device. For example, the input device or the system controller or the control target device may determine the current time of day $T_{ACTUAL}$ via a real-time clock.

After determining the current time of day, the device (an input device, a system controller, or a control device) may then override the show time of the natural show. The system override of the natural show may be enacted by adjusting the show time based on the current time of day $T_{ACTUAL}$ and the received request according to equations [2]-[4] shown in the table below.

| Request | Show Time |
| --- | --- |
| Forward Time by $\Delta T_{INC}$ | $T_{SHOW} = T_{ACTUAL} + \Delta T_{INC}$ [2] |
| Rewind Time by $\Delta T_{DEC}$ | $T_{SHOW} = T_{ACTUAL} - \Delta T_{DEC}$ [3] |
| Go to Time $T_{SHOW\_NEW}$ | $T_{SHOW} = T_{SHOW\_NEW}$ [4] |

For example, when a device (input device, system controller, or control device) receives a request to forward (rewind) time by $\Delta T_{INC}$ ($\Delta T_{DEC}$), the show time $T_{SHOW}$ may be increased (decreased) by that amount with respect to the current time of day $T_{ACTUAL}$ according to equations [2], [3], respectively. In a second example, when a device receives a request to go to a specific show time $T_{SHOW\_NEW}$, the device may adjust the show time $T_{SHOW}$ to be equal to the specific show time $T_{SHOW\_NEW}$, as shown in equation [4]. Adjusting the show time to not equal the current time of day may be a temporary system override, as will be described in further detail herein.

Subsequent to adjusting the show time, the method may continue at step 650 by determining one or more parameter value(s) at the adjusted show time. This may be done by the input device(s), the system controller, or the control device (s). For example, as previously described in FIGS. 5A and 5B, when the commands transmitted to the control device(s) includes the show time $T_{SHOW}$, step 650 may be performed by the control device(s). In another example, when the command(s) transmitted to the control device(s) include the specific parameter values corresponding to the show time $T_{SHOW}$, step 650 may be performed by the input device(s) or by the system controller.

The parameters value(s) may be determined based on one or more tables stored in a memory of a device. For example, the table may include one or more parameter value(s) at specific times of day. For example, the parameters of a lighting fixture or lamp may include color temperature and intensity at various times of day. The table may be used to determine the parameter value(s) at the show time (i.e., through interpolating between the given defined times on the table or by gradually adjusting the parameter values between each given time).

At step 660, the control devices may adjust their respective parameter values based on the determined parameter value(s) at the adjusted show time.

After adjusting the parameter values, at step 670, the device may determine whether to exit the system override (i.e., to reset the adjusted show time back to the current time of day after a timeout condition has occurred). The determination may be done in multiple different ways, examples of which will be described herein with reference to FIGS. 7A and 7B.

When the device determines to exit the system override (i.e., to reset the adjusted show time), the method may progress to step 680, where the device may resume adjusting parameter value(s) as a function of the current time of day.

That is, the show time $T_{SHOW}$ may be reset to be equal to the current time of day $T_{ACTUAL}$, according to equation [1]. The method may then end.

When the device determines not to exit the system override in step 670, the device may continue adjusting the parameter value(s) as a function of the adjusted show time in step 690, periodically determining whether to exit the system override at step 670 until the override is exited, where normal $T_{SHOW}$ resumes at step 680, and the method ends.

Figure 6B:
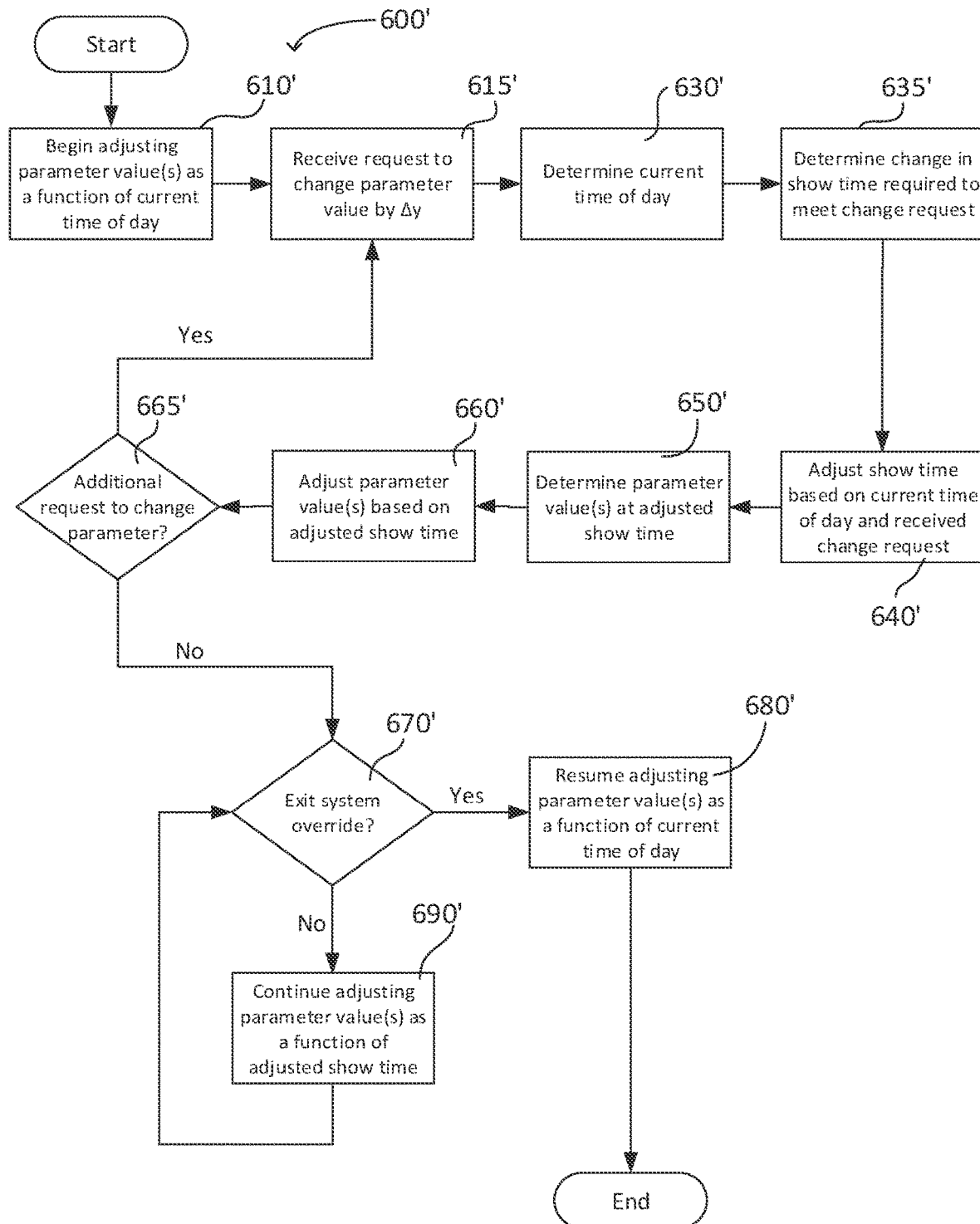

FIG. 6B is another method 600' of a system override of a natural show by changing a parameter value and correspondingly changing the show time to change the parameter value. For example, if a user desires to increase or decrease intensity of one or more lighting loads, for example light fixtures, lamps, etc., the highest quality light output may occur when changing intensity by changing the show time (i.e., to forward or rewind the natural show). However, depending on the specific programming of the natural show, a user may not know how to change the show time to elicit the desired change in intensity. Therefore, method 600' may allow a user to input a change in a parameter value and the system may determine how to adjust the show time of the natural show accordingly (i.e., changing the parameter value in accordance with the predefined curve mappings of the natural show). Method 600' may be similar to method 600 of FIG. 6A, where like numbers correspond to like steps. For example, steps 610', 630', and 640'-690' may correspond to steps 610, 630, and 640-690 of FIG. 6A.

The method may begin at step 610', as the natural show begins to play and a device of the load control system begins adjusting one or more parameter value(s) as a function of the current time of day, $T_{ACTUAL}$. At step 615', an input device (e.g., a keypad, mobile device, etc.) may receive a request to change a parameter value by an amount ΔY. The change in parameter value ΔY may be an increase in the parameter value or a decrease in the parameter value. For example, button 428 on keypad 400 of FIG. 4 may be pressed once (or pressed and held for an increment of time, e.g., one second) to decrease the intensity by 5% change in intensity.

In response to receiving the request to increase or decrease the parameter value, the method may continue at step 630' by determining a current time of day $T_{ACTUAL}$, as previously described in FIG. 6A. Step 630' may be implemented by the input device or by the system controller or the control target device. For example, the input device or the system controller may determine the current time of day $T_{ACTUAL}$ via a real-time clock.

At step 635', the change in show time required to meet the change request may be determined. For example, a device of the load control system may use the requested parameter value change ΔY, along with the current parameter value at the current time of day to determine the desired parameter value $Y_{NEW}$. For example, if the current intensity Y CURRENT is at 80%, and the requested parameter value change ΔY is a decrease of 5%, the desired parameter value $Y_{NEW}$ is an intensity of 75%. The desired parameter value $Y_{NEW}$ may then be used to determine the change in show time required to meet the change request.

The change in show time to meet the change request may depend on the configuration of the natural show and the current time of day. For example, for the natural show depicted in FIG. 2, the intensity increases between time T1 and time T2, and decreases between time T3 and time T4. Accordingly, if the desired change in parameter value is a decrease in intensity, when the current time of day is between time T1 and time T2, the device may determine to rewind the show time to decrease the intensity by the desired amount ΔY. However, when the current time of day is between time T3 and time T4 (with intensity decreasing over time), the device may determine to forward the show time to decrease the intensity by the desired amount ΔY.

The device may determine whether to forward or rewind the show time with respect to the time of day to meet the requested parameter value change ΔY based on the configuration of the natural show. For example, the natural show may be defined by a table of parameter values at various times of day. The device may determine, based on the current time of day and current parameter value, whether to rewind or forward the show time with respect to current time of day. This may be done in various ways. Because the natural show curves may take any shape, the device may use analytic techniques to determine the show time on the natural show curves that best correspond with the desired parameter value. For example, if the requested parameter change is a decrease in intensity, the device may determine the intensity at a time of day before the current time of day (i.e., the previous recorded value in the table immediately before the current time of day), and the intensity at a time of day immediately after the current time of day. The device may then compare the two intensities to the desired intensity $Y_{NEW}$ to determine which is closer. For example, the device may determine that the intensity at a time of day immediately after the current time of day is closer to the desired intensity $Y_{NEW}$ than an intensity at a time of day immediately before the current time of day (i.e., the show time must be forwarded with respect to the current time of day to reach the desired intensity $Y_{NEW}$). The device may continue to adjust the show time forward in time to reach a closer value to $Y_{NEW}$ until the difference between the intensity of the adjusted show time is minimized. Additionally, the device may determine that the desired parameter value $Y_{NEW}$ falls between two show times in the table. In this case, the device may either choose to adjust the show time to the show time with a corresponding parameter value that this closest to $Y_{NEW}$, or, the device may interpolate between the two show times to reach the desired parameter value $Y_{NEW}$ and save the new interpolated show time and $Y_{NEW}$ value as a new entry in the table.

One will understand that this is one example only, and that other examples and numerical techniques may be used to achieve similar results. For example, the device may use the table of parameter values to determine local (or global) maxima and minima. For example, the device may determine for a requested decrease in intensity, where the local minimum is located. If the local minimum occurs at a time before the current time of day, the device may determine to rewind the show time with respect to time of day. If the local minimum occurs at a time after the current time of day, the device may determine to forward the show time with respect to current time of day. Alternatively, this may be determined using the slope, binary searching, or other numerical methods.

At step 640', the device may adjust the show time to the determined show time $T_{SHOW\_NEW}$ to meet the requested change in parameter value ΔY. This determination may be done by an input device, a system controller, or one or more control devices, as previously described with respect to FIG. 6A. At step 650', the device may determine one or more parameter value(s) at the adjusted show time (i.e., in addition to the adjusted parameter $Y_{NEW}$). For example, the device may also determine a color temperature at the show time $T_{SHOW\_NEW}$.

At step 660', one or more control devices (i.e., control-target devices such as lighting control devices, window treatments, audio devices, etc.) may adjust the parameter value(s) based on the adjusted show time $T_{SHOW\_NEW}$. At step 665', the input device which received the request to change the parameter value in step 615' may determine if an additional request to change the parameter value has been received. For example, the keypad 400 may determine if a user has pressed/actuated button 428 a second time, or has held button 428 for an additional increment of time (e.g., one second). If the input device determines that an additional request has been received, the method may return to step 615' and continue to compute the change and adjust the show time (and thereby the parameter value, e.g., the intensity) in real-time. That is, the control devices (e.g., one or more lighting fixtures) may adjust the show time (and thereby changing the light output by adjusting one or more parameter value(s)) in real time. The user may stop actuating/holding the button 428 (or 430) when the light output in the room matches the light output of the user's choosing.

As previously described for FIG. 6A, after adjusting the parameter values, at step 670', the device may determine whether to exit the system override. The determination may be done in multiple different ways, examples of which will be described herein with reference to FIGS. 7A and 7B.

When the device determines to exit the system override, the method may progress to step 680', where the device may resume adjusting parameter value(s) as a function of the current time of day. That is, the show time $T_{SHOW}$ may be reset to be equal to the current time of day $T_{ACTUAL}$, according to equation [1]. The method may then end.

When the device determines not to exit the system override in step 670', the device may continue adjusting the parameter value(s) as a function of the adjusted show time in step 690', periodically determining whether to exit the system override at step 670' until the override is exited, normal $T_{SHOW}$ resumes at step 680', and the method ends.

Although the methods described herein disclose adjusting parameter values (e.g., CCT and intensity) as a function of the adjusted show time, the values of the parameters for each show time may be different based on whether the show time is equal to a current time of day or if the show time is adjusted (rewound/forwarded) with respect to the current time of day. For example, the parameter values for a show time of 6:00 p.m. at a current time of day of 6:00 p.m. may not necessarily be equivalent to parameter values of an adjusted show time of 6:00 p.m. at a current time of day of 8:00 p.m. That is, adjustment of the show time may cause the control devices to not only adjust the show time, but to additionally adjust which natural show curves are used at the show time in the natural show based on the adjustment. For example, if the show time is adjusted to 6:00 p.m. when the current time of day is 8:00 p.m., the previous natural show may include show curves for lighting control devices and a show curve for a position/level of a covering for a window treatment, where the covering of the window treatment may be open/partially open at 6:00 p.m. and may be fully closed at 8:00 p.m. When the show time is rewound to 6:00 p.m., however, the show curve for a window treatment control device may be removed from the natural show to prevent the window treatment from opening the covering to the 6:00 p.m. show time as defined by the window treatment natural show curve (since it may be dark outside at the current time of day of 8:00 p.m.), while the lighting control devices may remain part of the natural show and may rewind the respective parameters to the adjusted show time of 6:00 p.m.

In another example, the show time at 6 p.m. (corresponding to a time of day of 6 p.m.) may be programmed to turn the lights to intensity A and color temperature B and turn on a music station or playlist to a volume level of 50%. According to a first example, the adjusted show time of 6:00 p.m. (corresponding to a time of day of 8:00 p.m.) may be programmed to turn the lights to intensity A and color temperature B, and turn on the music station or playlist at a volume level of 50%, thereby fully re-creating the exact show as the 6:00 p.m. show time when the current time of day is 6:00 p.m. Alternatively, according to a second example, the adjusted show time of 6:00 p.m. (corresponding to a time of day of 8:00 p.m.) may be programmed to turn the lights to intensity A and color temperature B but may not turn on the music station or playlist. According to a third example, the adjusted show time of 6: p.m. (corresponding to a time of day of 8:00 p.m.) may be programmed to turn the lights to intensity C and color temperature D. Other examples are possible.

FIGS. 7A and 7B depict example processes 700, 750 that may occur in tandem with methods 600, 600' of FIGS. 6A and 6B, and may further be used in steps 670, 670', respectively, for determining whether to exit the system override.

The process 700 of FIG. 7A may begin when the show time is adjusted at step 710 (corresponding to steps 640, 640' of FIGS. 6A and 6B). In response to adjusting the show time, the device may start a timer at step 720. For example, if the device is a system controller, the device may start the timer when the command to adjust the show time is transmitted to a control device. According to a second example, if the device is a control device, the device may start the time when the parameter values of the electrical load are adjusted (i.e., intensity, etc.). Other examples are possible.

At step 730, the device may determine whether the timer is equal to or has exceeded a predetermined timeout threshold. The device may determine whether the timer is equal to or has exceeded the predetermined timeout threshold by comparing the timer to the predetermined timeout threshold. If the timer has not exceeded the timeout threshold, the device may continue to periodically (e.g., every ten minutes, or in any other desired increment of time) execute step 730 until the timer exceeds the timeout threshold. When the timer is equal to or exceeds the timeout threshold, the device may determine to exit the system override at step 740. For example, the timeout threshold may be a fixed amount of time, e.g., one hour; or, the threshold may be set by a user. At the exit of the system override, methods 600, 600' of FIGS. 6A and 6B may continue to step 680, 680', and may change the show time to equal the current time of day, adjusting the corresponding parameter value(s) accordingly. For example, one or more lighting control devices may gradually adjust a light intensity using a fade rate, for example.

Process 750 of FIG. 7B may begin when the show time is adjusted at step 760 (corresponding to steps 640, 640' of FIGS. 6A, 6B). At step 770, the device may determine whether the current time of day $T_{ACTUAL}$ is greater than or equal to a reset time $T_{RESET}$ by comparing the current time of day to the reset time. The reset time $T_{RESET}$ may be a fixed value, for example, 12:00 a.m., or the reset time may be set by a user. If the current time of day $T_{ACTUAL}$ is not greater than or equal to the reset time $T_{RESET}$, the device may continue to periodically (e.g., every ten minutes, or in any other desired increment of time) execute step 770 until the current time of day $T_{ACTUAL}$ is greater than or equal to the reset time $T_{RESET}$, at which time the method may progress to step 780 and the device may determine to exit the system override. At the exit of the system override, methods 600, 600' of FIGS. 6A and 6B may continue to step 680, 680', and may change the show time to equal the current time of day, adjusting the corresponding parameter value(s) accordingly.

Processes 700, 750 described in FIGS. 7A and 7B are provided as example methods (i.e., timeout conditions) by which to determine when to exit the system override in steps 670, 670' of FIGS. 6A, 6B, however, other methods are possible. For example, a user may press a button on the keypad 400 of FIG. 4, such as the natural show button 420, or one or more of buttons 422-426 (for example, static scene or show buttons) in order to exit the system override. When the system override exits, the show time may be reset to the current time of day, even if the current scene/show is static and does not change with respect to time.

Figure 8:
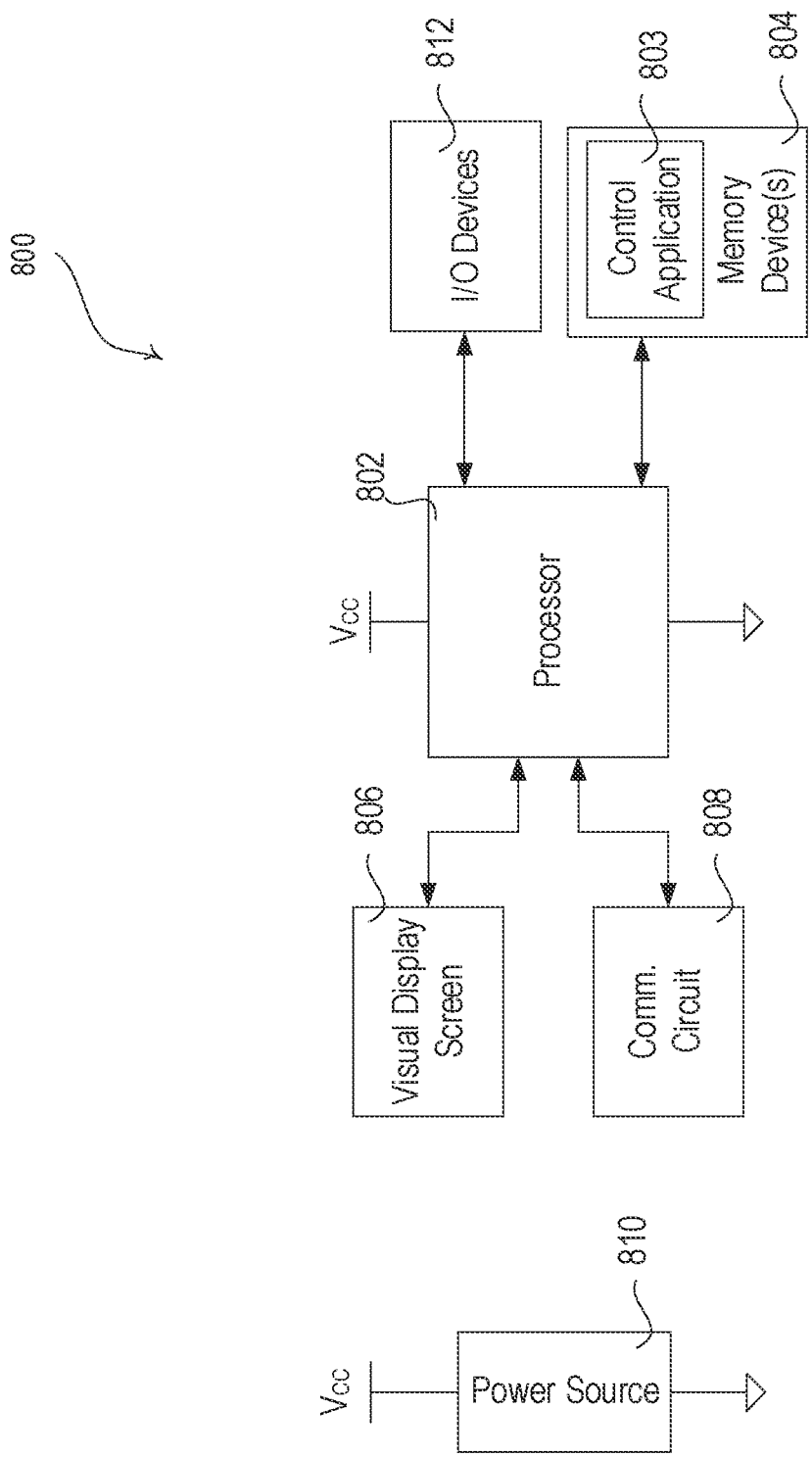
FIG. 8 is a block diagram of an example network device.

FIG. 8 is an example block diagram of a network device, for example, a network device 144, as shown in FIGS. 1, 3A, and 3B. Network device 800 may include one or more general purpose processors, special purpose processors, conventional processors, digital signal processors (DSPs), microprocessors, microcontrollers, integrated circuits, programmable logic devices (PLD), application specific integrated circuits (ASICs), or the like and/or may further include other processing element(s) such as one or more graphic processors (hereinafter collectively referred to as processor(s) 802). Processor(s) 802 may control the functionality of the network device and may execute the control application 803, in addition to other software applications such an operating system(s), database management systems, etc., to provide features and functions as describe herein. The processor(s) 802 may also perform signal coding, data processing, power control, input/output processing, and any other functionality that enables the network device 800 to perform as described herein.

The network device 800 may also include one or more memory modules/devices 804 (including volatile and non-volatile memory modules/devices) which may be non-removable memory modules/devices and/or removable memory modules/devices. Memory modules/devices 804 may be communicatively coupled to the processor(s) 802. Non-removable memory modules/devices 804 may include random-access memory (RAM), read-only memory (ROM), a hard disk(s), or any other type of non-removable memory storage. Removable memory modules/devices 804 may include a subscriber identity module (SIM) card, a memory stick, a memory card, or any other type of removable memory. The one or more memory modules/devices 804 may store the control application 803 and may also provide an execution space as the processor(s) execute the control application.

Network device 800 may also include a visual display screen(s)/terminal(s) 806 that may be communicatively coupled to the processor(s) 802. Together with processor(s) 802, visual display screen(s) 806 may display information to the user via one or more GUIs of a mobile application. The display screen(s) 806 and the processor(s) 802 may be in two-way communication, as the display screen 806 may include a touch sensitive visual screen module configured to receive information from a user and providing such information to the processor(s) 802 Network device 800 may also include one or more input/output (I/O) devices 812 (e.g., a keyboard, a touch sensitive pad, a mouse, a trackball, audio speaker, audio receiver, etc.) that may be communicatively coupled to the processor(s) 802. The I/O devices may allow the user to interact with the control application 803, for example.

Network device 800 may further include one or more transceivers/communications circuits (collectively, communications circuit(s) 808) for communicating (transmitting and/or receiving) over wired and/or wireless communication networks, for example. The communications circuit(s) 808 may include an RF transceiver(s) or other circuit(s) configured to perform wireless communications via an antenna(s). Communications circuit(s) 808 may be in communication with processor(s) 802 for transmitting and/or receiving information. Each of the modules within the network device 800 may be powered by a power source 810. The power source 810 may include an AC power supply and/or DC power supply, for example. The power source 810 may generate a supply voltage $V_{CC}$ for powering the modules within the network device 800.

In addition to including GUI-based software modules, for example, that provide the graphical features and visual images described herein, the control application 803 may also include a logic engine(s) for providing features of the GUI and features of the application in general as described herein. The GUI-based software modules and/or logic engine may be one or more software-based modules that include instructions, for example, which are stored on and/or execute from one or more tangible memory devices/modules of the network device as indicated above. Features of the control application may also and/or alternatively be provided by firmware and/or hardware in addition to/as an alternative to software based modules. Again, network device 800 is an example and the control application may execute on other types of computing devices.

In addition, the control application 803 is described herein as being a self-contained application that executes on the network device and communicates messages with the system controller 150, or directly to one or more control-target devices, for example. In other words, logic of the control application and generated graphics associated with the application are described herein as executing from the network device. Nonetheless, features and/or graphics of the control application may be implemented in other fashions, such as a web hosted application with the network device interfacing with the web hosted application using a local application (e.g., a web browser or other application) for providing features and functions as described herein.

Figure 9:
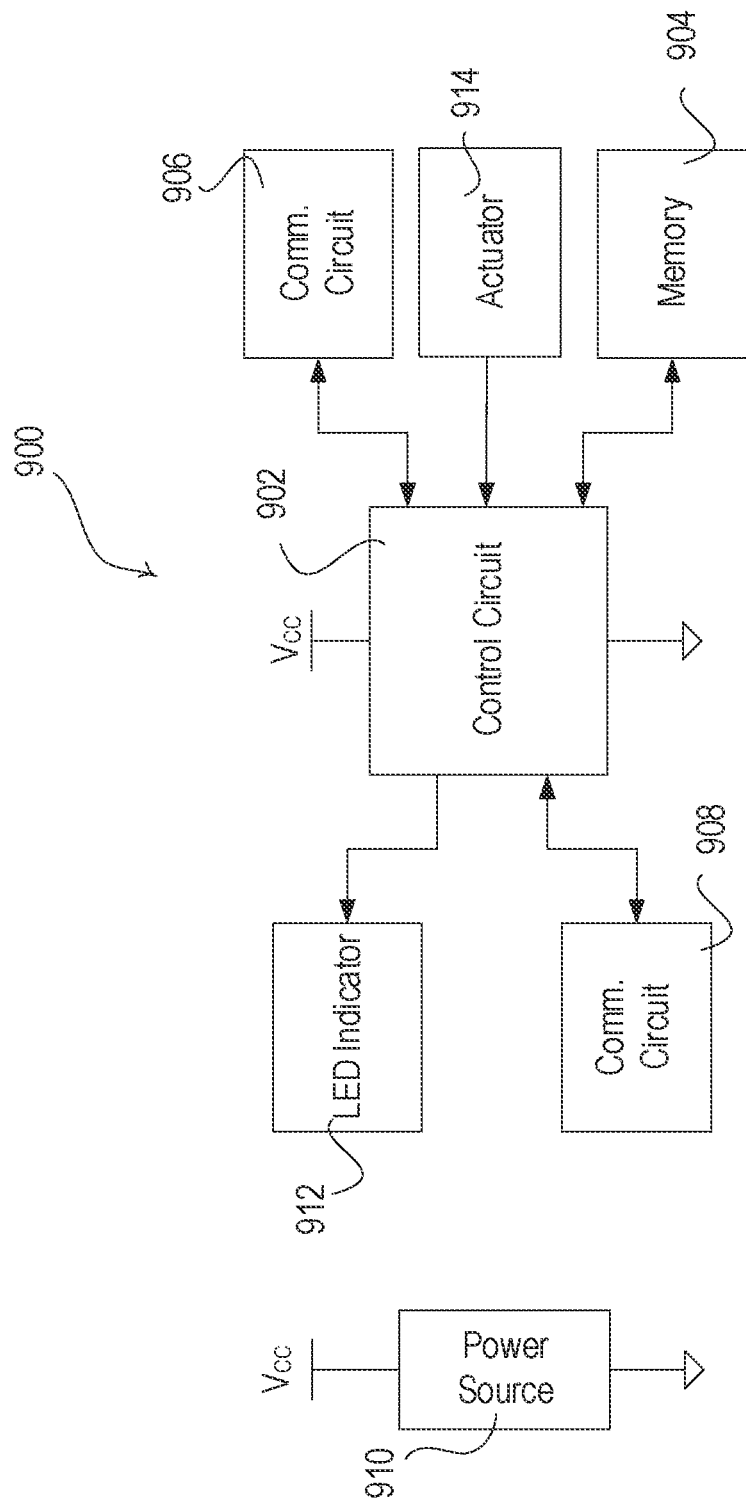
FIG. 9 is a block diagram of an example system controller.

FIG. 9 is a block diagram illustrating an example system controller 900 (such as system controller 150, described herein). The system controller 900 may include a control circuit 902. The control circuit 902 may be one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1202). The control circuit 902 may be configured to execute one or more software-based applications that include instructions that when executed by the control circuit may configure the control circuit to perform signal coding, data processing, power control, input/output processing, or any other function, process, and/or operation for example that enables the system controller 900 to perform as described herein. One will recognize that functions, features, processes, and/or operations described herein of the system controller 900 may also and/or alternatively be provided by firmware and/or hardware in addition to and/or as an alternative to software-based instructions. The control circuit 902 may store information in and/or retrieve information from the memory 904, including configuration information/configuration information file(s), backup file(s), creation times, and signature(s) as described herein.

Memory 904 may also store software-based instructions for execution by the control circuit 902 and may also provide an execution space as the control circuit executes instructions. Memory 904 may be implemented as an external integrated circuit (IC) or as an internal circuit of the control circuit 902. Memory 904 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. One will appreciate that the memory used to store configuration information file(s), and/or backup file(s), and/or software-based instructions, etc. may be the same and/or different memory modules/devices of the system controller. As one example, configuration information file(s) and software-based instructions may be stored in non-volatile memory modules/devices while backup(s) may be stored in volatile and/or non-volatile memory modules/devices.

The system controller 900 may include one or more communications circuits/network interface devices or cards 906 for transmitting and/or receiving information. The communications circuit 906 may perform wireless and/or wired communications. The system controller 900 may also, or alternatively, include one or more communications circuits/network interface devices/cards 908 for transmitting and/or receiving information. The communications circuit 906 may perform wireless and/or wired communications. Communications circuits 906 and 908 may be in communication with control circuit 902. The communications circuits 906 and/or 908 may include radio frequency (RF) transceivers or other communications modules configured to perform wireless communications via an antenna(s). The communications circuit 906 and communications circuit 1208 may be configured to perform communications via the same communication channels/protocols or different communication channels/protocols. For example, the communications circuit 906 may be configured to communicate (e.g., with a network device, over a network, etc.) via a wireless communication channel (e.g., BLUETOOTH®, Thread, ZigBee, near field communication (NFC), WIFI®, WI-MAX®, cellular, etc.) and the communications circuit 908 may be configured to communicate (e.g., with control devices and/or other devices in the load control system) via another wireless communication channel (e.g., WI-FI® or a proprietary communication channel, such as CLEAR CONNECT™).

The control circuit 902 may be in communication with an LED indicator(s) 912 for providing indications to a user. The control circuit 902 may be in communication with an actuator(s) 914 (e.g., one or more buttons) that may be actuated by a user to communicate user selections to the control circuit 902. For example, the actuator 914 may be actuated to put the control circuit 902 in an association mode and/or communicate association messages from the system controller 900.

Each of the modules within the system controller 900 may be powered by a power source 910. The power source 910 may include an AC power supply or DC power supply, for example. The power source 910 may generate a supply voltage $V_{CC}$ for powering the modules within the system controller 900. One will recognize that system controller 900 may include other, fewer, and/or additional modules.

Figure 10:
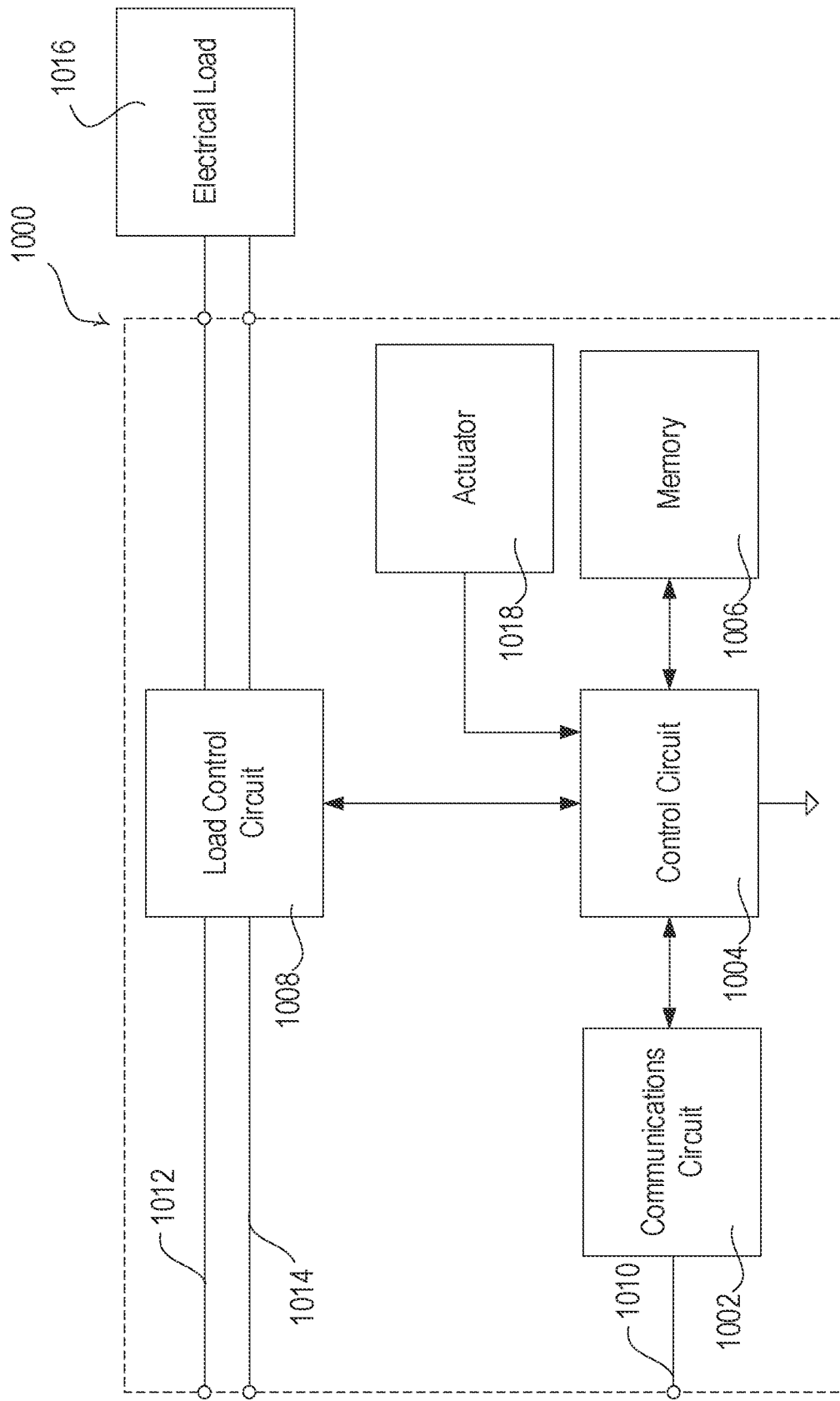
FIG. 10 is a block diagram of an example control-target device.

FIG. 10 is a block diagram illustrating an example control-target device 1000, e.g., a load control device, as described herein. The control-target device 1000 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The control-target device 1000 may include one or more communications circuits/network interface devices or cards 1002. The communications circuit 1002 may include a receiver, an RF transceiver, and/or other communications module configured to perform wired and/or wireless communications via communications link 1010. The control-target device 1000 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1004). The control circuit 1004 may be configured to execute one or more software-based applications that include instructions that when executed by the control circuit may configure the control circuit to perform signal coding, data processing, power control, input/output processing, or any other function, feature, process, and/or operation for example that enables the control-target device 1000 to perform as described herein. One will recognize that functions, features, processes, and/or operations described herein for the control-target device 1000 may also and/or alternatively be provided by firmware and/or hardware in addition to and/or as an alternative to software-based instructions.

The control circuit 1004 may store information in and/or retrieve information from the memory 1006. For example, the memory 1006 may maintain a registry of associated control devices and/or control configuration information. Memory 1006 may also store software-based instructions for execution by the control circuit 1004 and may also provide an execution space as the control circuit executes instructions. Memory 1006 may be implemented as an external integrated circuit (IC) or as an internal circuit of the control circuit 1004. Memory 1006 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control circuit 1004 may also be in communication with the communications circuit 1002.

The control-target device 1000 may include a load control circuit 1008. The load control circuit 1008 may receive instructions from the control circuit 1004 and may control an electrical load 1016 based on the received instructions. The load control circuit 1008 may send status feedback to the control circuit 1004 regarding the status of the electrical load 1016. The load control circuit 1008 may receive power via a hot connection 1012 and a neutral connection 1014 and may provide an amount of power to the electrical load 1016. The electrical load 1016 may include any type of electrical load.

The control circuit 1004 may be in communication with an actuator 1018 (e.g., one or more buttons) that may be actuated by a user to communicate user selections to the control circuit 1004. For example, the actuator 1018 may be actuated to put the control circuit 1004 in an association mode or discovery mode and may communicate association messages or discovery messages from the control-target device 1000. One will recognize that control-target device 1000 may include other, fewer, and/or additional modules.

Figure 11:
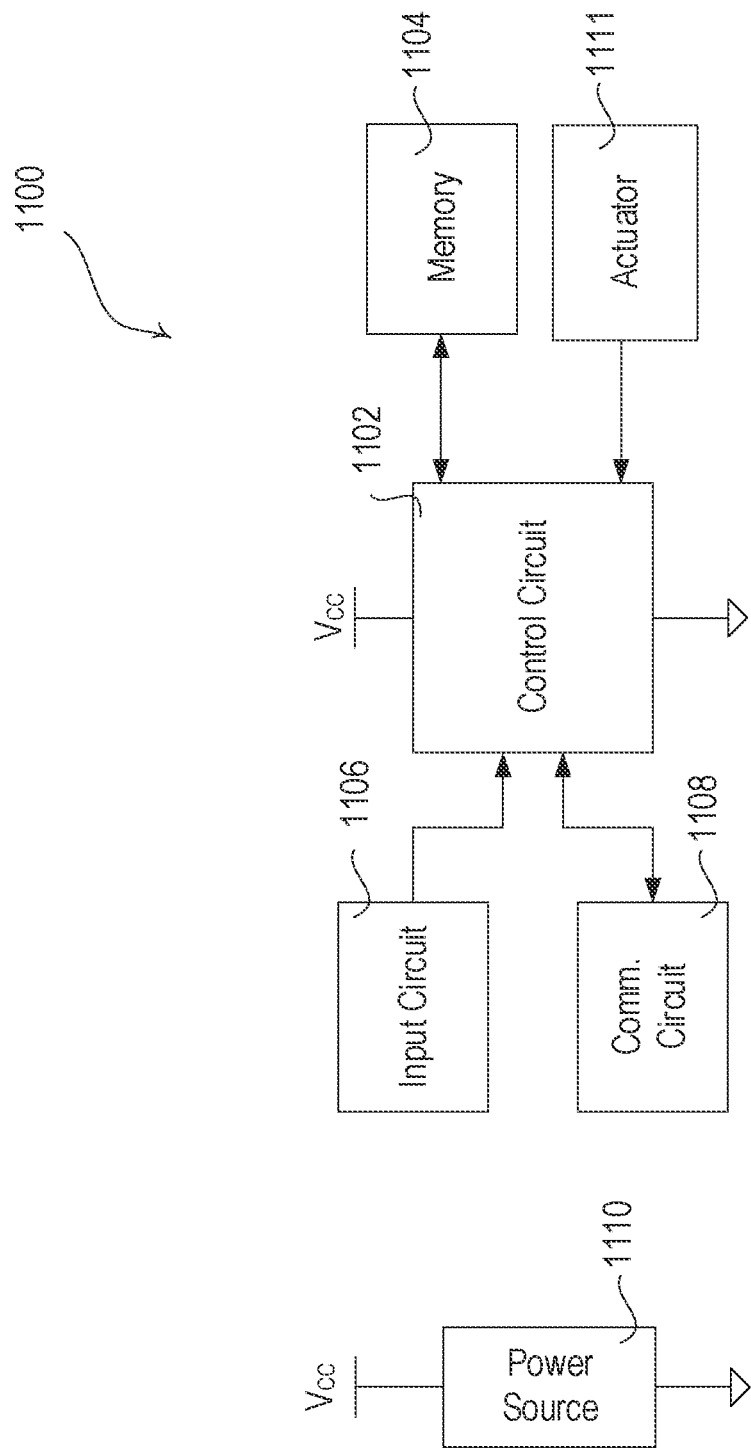
FIG. 11 is a block diagram of an example control-source device.

FIG. 11 is a block diagram illustrating an example control-source device 1100 as described herein. The control-source device 1100 may be a keypad, remote control device, an occupancy sensor, a daylight sensor, a window sensor, a temperature sensor, and/or the like. The control-source device 1100 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 1102). The control circuit 1102 may be configured to execute one or more software-based applications that include instructions that when executed by the control circuit may configure the control circuit to perform signal coding, data processing, power control, input/output processing, or any other function, feature, process, and/or operation for example that enables the control-source device 1100 to perform as described herein. One will recognize that functions, features, processes, and/or operations described herein for the control-source device 1100 may also and/or alternatively be provided by firmware and/or hardware in addition to and/or as an alternative to software-based instructions. The control circuit 1102 may store information in and/or retrieve information from the memory 1104. Memory 1104 may also store software-based instructions for execution by the control circuit 1102 and may also provide an execution space as the control circuit executes instructions. Memory 1104 may be implemented as an external integrated circuit (IC) or as an internal circuit of the control circuit 1102. Memory 1104 may include volatile and non-volatile memory modules/devices and may be non-removable memory modules/devices and/or a removable memory modules/devices. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control-source device 1100 may include one or more communications circuits/network interface devices or cards 1108 for transmitting and/or receiving information. The communications circuit 1108 may transmit and/or receive information via wired and/or wireless communications via communications circuit 1108. The communications circuit 1108 may include a transmitter, an RF transceiver, and/or other circuit configured to perform wired and/or wireless communications. The communications circuit 1108 may be in communication with control circuit 1102 for transmitting and/or receiving information.

The control circuit 1102 may also be in communication with an input circuit(s) 1106. The input circuit 1106 may include an actuator(s) (e.g., one or more buttons) and/or a sensor circuit (e.g., an occupancy sensor circuit, a daylight sensor circuit, or a temperature sensor circuit) for receiving input that may be sent to a control-target device for controlling an electrical load. For example, the control-source device may receive input from the input circuit 1106 to put the control circuit 1102 in an association mode and/or communicate association messages from the control-source device. The control circuit 1102 may receive information from the input circuit 1106 (e.g., an indication that a button has been actuated or sensed information). Each of the modules within the control-source device 1100 may be powered by a power source 1110. One will recognize that control-source device 1100 may include other, fewer, and/or additional modules.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

One will understand that the embodiments provided herein are intended as representative examples only, and that the disclosure is not limited to these examples. For example, although the load control system has been described herein pertaining to a room or area, multiple rooms in a residence or building may also be part of the load control system. However, different rooms may operate on different natural show schedules, with different show times, which may be adjusted independently. Further, the network devices, which have been described as communicating to a system controller via the Internet, may alternatively communicate directly to the system controller. Accordingly, the above description of example embodiments does not constrain this disclosure. Other examples are possible which are also considered within the scope of this disclosure.

What is claimed is:

1. A system controller, comprising:
    electric load controller control circuitry communicatively couplable to a plurality of electric load devices, the electric load controller control circuitry to:
        adjust one or more operational parameters of each of the plurality of electric load devices according to a defined natural show and based on a current time of day;
        receive an input representative of a temporal offset from the current time of day in the defined natural show;
        determine an end condition associated with the received temporal offset;
        determine a shifted time of day in the defined natural show by adjusting the current time of day by the received temporal offset;
        determine the one or more operational parameters for each of the plurality of electric load devices at the shifted time of day in the defined natural show;
        adjust the one or more operational parameters for each of the electric load devices based on the shifted time of day in the defined natural show;
        assess whether the end condition has been fulfilled; and
        responsive to the assessment that the end condition has been fulfilled:
            determine the one or more operational parameters for each of the plurality of electric load devices at the current time of day; and revert the one or more operational parameters for each of the electric load devices to the defined natural show at the current time of day.

2. The system controller of claim 1 wherein to receive the input representative of the temporal offset from the current time of day in the defined natural show, the electric load controller control circuitry to further:
receive an input representative of one of:
a fast forward offset to a future time of day in the defined natural show; or
a rewind offset to a prior time of day in the defined natural show.

3. The system controller of claim 1 wherein to determine the end condition associated with the received temporal offset, the electric load controller control circuitry to further:
receive an input that associates a duration of the temporal offset with the end condition.

4. The system controller of claim 1 wherein to determine the end condition associated with the received temporal offset, the electric load controller control circuitry to further:
receive an input that associates a current time of day with the end condition.

5. A method of controlling a plurality of electrical loads, comprising:
adjusting, by electric load controller control circuitry, one or more operational parameters of each of a plurality of electric load devices according to a defined natural show and based on a current time of day;
receiving, by the electric load controller control circuitry, an input representative of a temporal offset from the current time of day in the defined natural show;
determining, by the electric load controller control circuitry, an end condition associated with the received temporal offset;
determining, by the electric load controller control circuitry, a shifted time of day in the defined natural show by adjusting the current time of day by the received temporal offset;
determining, by the electric load controller control circuitry, the one or more operational parameters for each of the plurality of electric load devices at the shifted time of day in the defined natural show;
adjusting, by the electric load controller control circuitry, the one or more operational parameters for each of the electric load devices based on the shifted time of day in the defined natural show;
assessing, by the electric load controller control circuitry, whether the end condition has been fulfilled; and
responsive to the assessment by the electric load controller control circuitry that the end condition has been fulfilled:
determining, by the electric load controller control circuitry, the one or more operational parameters for each of the plurality of electric load devices at the current time of day; and
reverting, by the electric load controller control circuitry, the one or more operational parameters for each of the electric load devices to the defined natural show at the current time of day.

6. The method of claim 5 wherein receiving the input representative of the temporal offset from the current time of day in the defined natural show, further comprises:
receiving, by the electric load controller control circuitry, an input representative of one of:
a fast forward offset to a future time of day in the defined natural show; or
a rewind offset to a prior time of day in the defined natural show.

7. The method of claim 5 wherein determining the end condition associated with the received temporal offset, further comprises:
receiving, by the electric load controller control circuitry, an input that associates a duration of the temporal offset with the end condition.

8. The method of claim 5 wherein determining the end condition associated with the received temporal offset, further comprises:
receiving, by the electric load controller control circuitry, an input that associates a current time of day with the end condition.

9. A non-transitory, machine-readable, storage device that includes instructions that, when executed by electric load controller control circuitry, cause the electric load controller control circuitry to:
adjust one or more operational parameters of each of a plurality of electric load devices according to a defined natural show and based on a current time of day;
receive an input representative of a temporal offset from the current time of day in the defined natural show;
determine an end condition associated with the received temporal offset;
determine a shifted time of day in the defined natural show by adjusting the current time of day by the received temporal offset;
determine the one or more operational parameters for each of the plurality of electric load devices at the shifted time of day in the defined natural show;
adjust the one or more operational parameters for each of the electric load devices based on the shifted time of day in the defined natural show;
assess whether the end condition has been fulfilled; and
responsive to the assessment by the electric load controller control circuitry that the end condition has been fulfilled:
determine the one or more operational parameters for each of the plurality of electric load devices at the current time of day; and
revert the one or more operational parameters for each of the electric load devices to the defined natural show at the current time of day.

10. The non-transitory, machine-readable, storage device of claim 9 wherein the instructions that cause the electric load controller control circuitry to receive the input representative of the temporal offset from the current time of day in the defined natural show, further cause the electric load controller control circuitry to:
receive an input representative of one of:
a fast forward offset to a future time of day in the defined natural show; or
a rewind offset to a prior time of day in the defined natural show.

11. The non-transitory, machine-readable, storage device of claim 9 wherein the instructions that cause the electric load controller control circuitry to determine the end condition associated with the received temporal offset, further cause the electric load controller control circuitry to:
receive an input that associates a duration of the temporal offset with the end condition.

12. The non-transitory, machine-readable, storage device of claim 9 wherein the instructions that cause the electric load controller control circuitry to determine the end condition associated with the received temporal offset, further cause the electric load controller control circuitry to:

receive an input that associates a current time of day with the end condition.

13. An electric load control system, comprising:
one or more electric load devices;
controller circuitry communicatively coupled via one or more wireless networks to each of the one or more electric load devices, the controller circuitry to:
  adjust, based on a current system time, one or more operational parameters of the one or more electric load devices according to a defined natural show;
  receive an input that includes data representative of:
    a temporal offset from the current system time in the defined natural show; and
    a temporal offset end condition;
  determine a shifted system time in the defined natural show by adjusting the current system time by the received temporal offset;
  determine the one or more operational parameters for each of the one or more electric load devices in the defined natural show at the shifted system time;
  adjust the one or more operational parameters for each of the one or more electric load devices in the defined natural show based on the shifted system time;
  assess whether the temporal offset end condition has been fulfilled; and
  responsive to the assessment that the temporal offset end condition has been fulfilled:
    determine the one or more operational parameters for each of the one or more electric load devices at the then current system time; and
    revert the one or more operational parameters for each of the one or more electric load devices to the defined natural show at the current system time.

14. The electric load control system of claim 13 wherein to adjust, based on the current system time, the one or more operational parameters of the one or more electric load devices according to the defined natural show, the control circuitry to further:
  adjust, based on the current system time, the one or more operational parameters of the one or more electric load devices according to the defined natural show;
  wherein the current system time corresponds to the local time-of-day.

15. The electric load control system of claim 13 wherein to receive an input that includes data representative of the temporal offset end condition, the control circuitry to further:
  receive an input that includes data representative of a temporal offset end condition that includes a defined time interval to operate at the shifted system time.

16. The electric load control system of claim 13 wherein to receive an input that includes data representative of the temporal offset end condition, the control circuitry to further:
  receive an input that includes data representative of a temporal offset end condition that includes an occurrence of a defined event.

17. The electric load control system of claim 13 wherein to receive an input that includes data representative of the temporal offset end condition, the control circuitry to further:
  receive an input that includes data representative of a temporal offset end condition that includes a current system time to revert the defined natural show to the then current system time.

* * * * *